US012793202B2

(12) United States Patent
Wesley et al.

(10) Patent No.: US 12,793,202 B2
(45) Date of Patent: Nov. 10, 2026

(54) MACHINE LEARNING MODEL FOR GENERATING QUALITY SENSITIVITY SCORES FOR ITEM TAXONOMY NODES

(71) Applicant: Maplebear Inc., San Francisco, CA (US)

(72) Inventors: Charles Wesley, San Diego, CA (US); Brent Scheibelhut, Toronto (CA)

(73) Assignee: Maplebear Inc., San Francisco, CA (US)

(*) Notice: Subject to any disclaimer, the term of this patent is extended or adjusted under 35 U.S.C. 154(b) by 183 days.

(21) Appl. No.: 18/940,800

(22) Filed: Nov. 7, 2024

(65) Prior Publication Data

US 2026/0127729 A1 May 7, 2026

(51) Int. Cl.

| | |
|---|---|
| ***G06T 7/00*** | (2017.01) |
| ***G06Q 30/0601*** | (2023.01) |
| ***G06V 10/44*** | (2022.01) |
| ***G06V 20/52*** | (2022.01) |
| ***G06V 40/20*** | (2022.01) |

(52) U.S. Cl.

CPC ....... *G06T 7/0008* (2013.01); *G06Q 30/0623* (2013.01); *G06Q 30/0631* (2013.01); *G06Q 30/0633* (2013.01); *G06V 10/44* (2022.01); *G06V 20/52* (2022.01); *G06V 40/20* (2022.01); *G06T 2207/20081* (2013.01); *G06T 2207/30128* (2013.01); *G06T 2207/30242* (2013.01)

(58) Field of Classification Search

CPC ......... G06T 7/0008; G06T 2207/20081; G06T 2207/30128; G06T 2207/30242; G06Q 30/0623; G06Q 30/0631; G06Q 30/0633; G06V 10/44; G06V 20/52; G06V 40/20

See application file for complete search history.

(56) References Cited

U.S. PATENT DOCUMENTS

| | | | | |
|---|---|---|---|---|
| 2020/0151692 A1* | 5/2020 | Gao | ......................... | G06N 3/08 |
| 2021/0118036 A1* | 4/2021 | Jiang | ...................... | G06N 20/00 |
| 2022/0114868 A1* | 4/2022 | Bronicki | ................ | G06Q 30/06 |
| 2022/0374967 A1* | 11/2022 | Bronicki | ............ | G06Q 30/0627 |

OTHER PUBLICATIONS

Kitukale et al, Machine Learning Driven Product Recommendations for Enhanced Shopping Cart Personalization, 2024, IEEE Technology & Engineering Management Conference, pp. 1-8. (Year: 2024).*
Yao et al, Radar Self-Following Shopping Cart Based on Multi-Sensor Fusion, 2023, IEEE Access 11; 77-55-77072. (Year: 2023).*

* cited by examiner

*Primary Examiner* — Kathleen M Broughton
(74) *Attorney, Agent, or Firm* — Fenwick & West LLP

(57) ABSTRACT

A shopping cart includes sensors configured to collect data about a physical interaction of a user with a product in a retail store. A set of features, such as product quality score, interaction duration, sequence of product interaction, and/or whether the product was added to the cart, are extracted from the data. These features are fed into a machine learning model to determine the user's quality preference score, indicating a likelihood that the user would be dissatisfied with the quality of the product. If a user orders online and their quality preference score surpasses a threshold, a notification is sent to the picker fulfilling the order. Furthermore, the user may send in satisfaction feedback via a client device of the user. Such feedback may subsequently be used to retrain the machine learning model.

20 Claims, 6 Drawing Sheets

MACHINE LEARNING MODEL FOR GENERATING QUALITY SENSITIVITY SCORES FOR ITEM TAXONOMY NODES

BACKGROUND

Users of an online system may have different quality preferences for different types of items. For example, some users prioritize high-quality produce, seeking items that are free from bruises and other imperfections. Other users are more concerned about the condition of the packaging for consumer-packaged goods (CPG) products, preferring items without dented or damaged boxes. But a source of products (e.g., a warehouse or a store) may have a limited supply of top-quality produce and perfectly packaged CPG items. When a user with a high sensitivity to the quality of produce or packaging places an order, there is a risk that the order may be fulfilled with an item that does not meet the user's high-quality standards, resulting in user dissatisfaction. Conversely, when a user who is not sensitive to the quality of produce or packaging places an online order, the selection of a high-quality item by the picker often goes unnoticed and unappreciated by the user. Accordingly, it is desirable to fulfill users' orders based on their different sensitivities to quality for different types of items.

However, existing online concierge systems lack a mechanism to obtain users' preferences regarding product quality. This limitation means that the systems cannot prioritize users based on their individual quality preferences across different types of items. Limited high-quality items may be randomly distributed, with users who do not prioritize quality in certain types of items receiving these items while users who do prioritize quality of those types of items receive lower-quality items. This misallocation can result in suboptimal utilization of limited high-quality resources. Users with specific quality preferences may receive items that do not meet their expectations, leading to dissatisfaction and potential loss of trust in the service.

It is not trivial to obtain and maintain users' sensitivities to quality for different types of items. A conventional approach may be to survey the users, but this is impractical. In particular, there are a large number of types of items and a large number of users; moreover, the users' sensitivities may change over time. Accordingly, there is a need for technical systems that can infer the users' quality sensitivities implicitly based on observed behaviors without the need for surveys or other mechanisms that do not scale well.

SUMMARY

In one or more embodiments, a system determines different users' quality sensitivities for different types of items based on the users' interactions with items. The system can then use these sensitivities to optimize fulfillment of items across all users, thereby maximizing overall utility for all users.

One or more embodiments determine the users' sensitivities by implementing sensors onto shopping carts to collect data about a physical interaction of a user with a product. A set of input features are extracted from the collected data. The input features may include, for example, a quality score for the product, a length of time that the user interacted with the product, a number of other products interacted with by the user before the product was added to the shopping cart, whether the user added the product to the shopping cart after interacting with the product, or whether the user added another product to the shopping cart after interacting with the product. A trained machine learning model is applied to the input features to determine a quality preference score of a particular user for a particular category of product. In one or more embodiments, the quality preference score indicates a likelihood that the user would be dissatisfied with the item if its quality is below a threshold. The quality preference scores of the user for each of a set of product types may be stored in connection with an account of the user in a database, or the scores may be generated in real time as needed.

In one or more embodiments, the quality preference scores are used by an online concierge system that is fulfilling an order placed by a user. For example, a user may place an online order from a client device of the user. The online order includes a product within a target category of products. is the system then generates a quality preference score of the user for the target category. If the quality preference score is greater than a threshold, the system may send a notification about the quality preference score to a client device of a picker who is fulfilling the order.

In one or more embodiments, the machine learning model is trained based on observed interactions by users with products. For example, the system observes a user's interactions with products and generates a training example by extracting the input features from those observed interactions along with a label indicating the user's satisfaction with the item that is ultimately selected. The system may also periodically retrain the model following its use to predict user sensitives (e.g., with respect to certain types of items), thereby improving the model over time. For example, a user may provide feedback later via a client device, where the user feedback indicates whether the user was satisfied or dissatisfied withdissatisfied with the quality of the product received from the order. The machine learning model may then be retrained using the user feedback to label new training examples.

DETAILED DESCRIPTION

System Architecture

Figure 1:
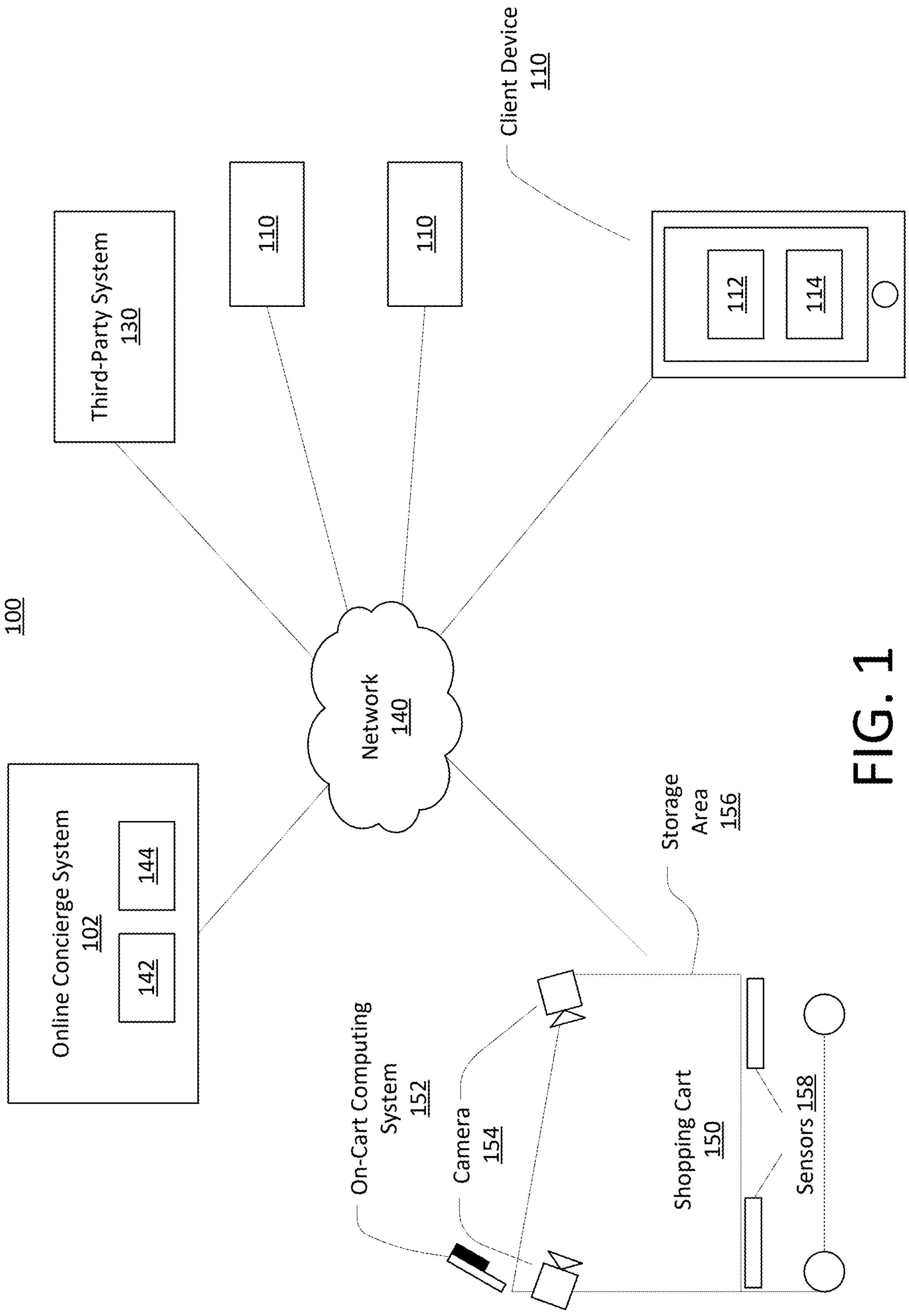
FIG. 1 is a block diagram of a system environment in which a shopping cart, an online concierge system, one or more third-party systems, and one or more client devices may operate, according to one or more embodiments.

FIG. 1 is a block diagram of a system environment 100 in which a shopping cart 150 and an online system, such as an online concierge system 102 as further described below in conjunction with FIGS. 2 and 3, operate. The system environment 100 shown in FIG. 1 comprises one or more client devices 110, a network 120, one or more third-party systems 130, one or more smart shopping carts 150 (hereinafter also referred to as "shopping cart"), and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The client devices 110 are one or more computing devices capable of receiving user input as well as transmitting and/or receiving data via the network 120. In one embodiment, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online concierge system 102. For example, the client device 110 executes a customer mobile application 206 or a picker mobile application 212, as further described below in conjunction with FIG. 2, to enable interaction between the client device 110 and the online concierge system 102. As an additional example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing various functions. In various embodiments, a client device 110 includes a memory 114 comprising a non-transitory storage medium on which instructions are encoded. The memory 114 may have instructions encoded thereon that, when executed by the processor 112, cause the processor 112 to perform functions to execute the customer mobile application 206 or the picker mobile application 212 to provide the functions further described below in conjunction with FIG. 2.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online concierge system 102, the client device(s) 110, or the physical retail store(s) 104. In one embodiment, a third-party system 130 is an application provider communicating information describing applications for execution by a client device 110 or communicating data to client devices 110 for use by an application executing on the client device 110. In other embodiments, a third-party system 130 provides content or other information for presentation via a client device 110. For example, a third-party system 130 stores one or more web pages and transmits the web pages to a client device 110 or to the online concierge system 102. A third-party system 130 may also communicate information to the online concierge system 102, such as advertisements, content, or information about an application provided by the third-party system 130.

The online concierge system 102 includes one or more processors 142 configured to control operation of the online concierge system 102 by performing various functions. In various embodiments, the online concierge system 102 includes a memory 144 comprising a non-transitory storage medium on which instructions are encoded. The memory 144 may have instructions encoded thereon corresponding to the modules further described below in conjunction with FIGS. 3-4 that, when executed by the processor 142, cause the processor 142 to perform the functionality further described below in conjunction with FIG. 2 and FIGS. 4-6. For example, the memory 144 has instructions encoded thereon that, when executed by the processor 142, cause the processor 142 to display information related to an item in a physical retail store based on contextual information associated with a shopping cart 150. Additionally, the online concierge system 102 includes a communication interface configured to connect the online concierge system 102 to one or more networks, such as network 120, or to otherwise communicate with devices (e.g., client devices 110) connected to the network(s).

One or more physical shopping carts 150 may be coupled to the network 120 for communicating various types of information with the online concierge system 102, the client device(s) 110, or the third-party system(s) 130. In some embodiments, a physical retail store (e.g., a physical grocery store) is associated with a planogram, which the planogram indicates a placement of each item (e.g., each retail product) within the physical retail store, as well as a layout of the physical retail store. For example, a planogram associated with a physical retail store may indicate the placement of items on shelves, in display cases, in aisles, or within any other suitable organizational elements that are used to organize the items within the physical retail store. In this example, the planogram also may include a layout of the physical retail store, which describes the location of these organizational elements relative to each other and to building elements of the physical retail store (e.g., walls, doors, stairs, elevators, etc.).

In some embodiments, a physical retail store may be associated with a computing system configured to communicate updates to a planogram of the physical retail store to the online concierge system 102, the client device(s) 110, and/or the third-party system(s) 130 (e.g., periodically, upon updating the placement of an item within the physical retail store or a layout of the physical retail store, etc.). A planogram associated with a physical retail store may be used to identify one or more items within a threshold distance of a storage area 156 in the physical retail store and/or to detect an event within the physical retail store, as further described below.

A physical retail store may include one or more shopping carts 150 capable of collecting information as well as transmitting and/or receiving data via the network 120. Each shopping cart 150 within the physical retail store may include an on-cart computing system 152, The on-cart computing system 152 comprises one or more processors configured to control operation of the shopping cart 150 by performing various functions. In various embodiments, the on-cart computing system 152 includes a memory comprising a non-transitory storage medium on which instructions are encoded. The memory may have instructions encoded thereon corresponding to some of the modules further described below in conjunction with FIG. 3 that, when executed by the one or more processors, cause the one or more processors to perform some of the functionality further described below in conjunction with FIG. 2 and FIGS. 4-6.

Each shopping cart 150 within a physical retail store also may include a storage area 156 that customers of the physical retail store or pickers for the online concierge system 102 may use to carry items they have collected during a shopping session. In some embodiments, a storage area 156 includes a wheeled cart made of plastic, metal, or any other suitable material or combination of materials. In various embodiments, a shopping cart 150 alternatively may include a shopping basket, a mobility scooter, a hand truck, a utility cart, or any other object that may be used to carry items collected during a shopping session.

Each shopping cart 150 also may include various sensors 158. In some embodiments, the one or more sensors 158 are configured to capture measurements describing the shopping cart 150, items in the shopping cart's storage area, or the area around the shopping cart 150. For example, the one or more sensors 158 may include load sensors that measure the weight of items placed in the shopping cart's storage area. Load sensors are further described below. In some embodiments, the one or more sensors 158 may include proximity sensors that capture measurements for detecting when an item is added to the shopping cart 150. The shopping cart 150 may transmit data from the one or more sensors to the remote system 130.

In some embodiments, the one or more load sensors may be scales that detect the weight (e.g., the load) of the content in the storage area 115 of the shopping cart 150. The load sensors can also capture load curves—the load signal produced over time as an item is added to the cart or removed from the cart. The load sensors may be attached to the shopping cart 150 in various locations to pick up different signals that may be related to items added at different positions of the storage area. For example, a shopping cart 150 may include a load sensor 170 at each of the four corners of the bottom of the storage area 115. In some embodiments, the load sensors may record load data continuously while the shopping cart 150 is in use. In other embodiments, the shopping cart 150 may include some triggering mechanism, for example a light sensor, an accelerometer, or another sensor to determine that the user is about to add an item to the shopping cart 150 or about to remove an item from the shopping cart 150. The triggering mechanism causes the load sensors to begin recording load data for some period of time, for example a preset time range.

In some embodiments, the one or more sensors 158 may include one or more wheel sensors that measure wheel motion data of the one or more wheels. The wheel sensors may be coupled to one or more of the wheels on the shopping cart. In some embodiments, a shopping cart 150 includes at least two wheels (e.g., four wheels in the majority of shopping carts) with two wheel sensors coupled to two wheels. In further embodiments, the two wheels coupled to the wheel sensors can rotate about an axis parallel to the ground and can orient about an axis orthogonal or perpendicular to the ground. In other embodiments, each of the wheels on the shopping cart has a wheel sensor (e.g., four wheel sensors coupled to four wheels). The wheel motion data includes at least rotation of the one or more wheels (e.g., information specifying one or more attributes of the rotation of the one or more wheels). Rotation may be measured as a rotational position, rotational velocity, rotational acceleration, some other measure of rotation, or some combination thereof. Rotation for a wheel is generally measured along an axis parallel to the ground. The wheel rotation may further include orientation of the one or more wheels. Orientation may be measured as an angle along an axis orthogonal or perpendicular to the ground. For example, the wheels are at 0° when the shopping cart is moving straight and forward along an axis running through the front and the back of the shopping cart. Each wheel sensor may be a rotary encoder, a magnetometer with a magnet coupled to the wheel, an imaging device for capturing one or more features on the wheel, some other type of sensor capable of measuring wheel motion data, or some combination thereof.

In some embodiments, one or more sensors 158 may be capable of identifying physical objects within a physical retail store (e.g., via machine vision, object recognition sensors 158, etc.). For example, sensors 158 mounted on a storage area 156 may include one or more cameras (e.g., video cameras or digital cameras that capture still images) facing the interior of the storage area 156 that are capable of identifying items (e.g., retail products) added to the storage area 156. In the above example, sensors 158 mounted on the storage area 156 also may include one or more cameras facing out of the storage area 156 that are capable of identifying items on shelves, in display cases, in aisles, or within any other suitable organizational elements that are used to organize items within the physical retail store. Additionally, in the above example, the cameras facing out of the storage area 156 also may be capable of identifying the organizational elements and building elements of the physical retail store (e.g., walls, doors, stairs, elevators, etc.). In some embodiments, the sensors 158 have various capabilities to help identify items, organizational elements, and/or building elements within a physical retail store. For example, if the sensors 158 of a shopping cart 150 include one or more cameras, the cameras may have features such as face detection, text detection, infrared detection, night vision, motion activation, etc.

In some embodiments, the one or more sensors 158 are configured to collect additional contextual information associated with the shopping cart 150. Contextual information associated with the shopping cart 150 may describe one or more locations of the shopping cart 150 within a physical retail store, a state of the shopping cart 150, and/or a set of items within the shopping cart 150. The state of the shopping cart 150 may indicate whether the shopping cart 150 is moving or stationary. In some embodiments, the state of a shopping cart 150 also or alternatively may indicate whether the shopping cart 150 is moving less than a threshold speed, whether the shopping cart 150 has moved less than a threshold distance within a specified amount of time, whether the shopping cart 150 has reversed directions, a velocity of the shopping cart 150, an orientation of the shopping cart 150, or any other suitable information describing a state of the shopping cart 150. In some embodiments, the sensors 158 may be mounted on the shopping cart 150 (e.g., along the periphery of the shopping cart 150). In embodiments in which a shopping cart 150 includes an object other than a shopping cart 150 (e.g., a shopping basket, a mobility scooter, etc.), the sensors 158 may collect contextual information associated with the object and may be mounted on the object (e.g., along the periphery of a shopping basket).

In some embodiments, the sensor(s) 158 may be capable of collecting the following contextual information associated with a shopping cart 150 (or other object): location information (e.g., GPS coordinates), motion, proximity/distance (e.g., from an item, an organizational element used to organize items, and/or a building element of a physical retail store), various wavelengths (e.g., visible light, infrared light, etc.), colors, sound, speed, weight, vibration, etc. For example, a GPS sensor 158 and proximity sensors 158 (e.g., laser or ultrasonic proximity sensors 158) mounted on the shopping cart 150 may collect information describing the location of the shopping cart 150 relative to items, aisles, service counters, etc. within a physical retail store. In this example, information describing the location of the shopping cart 150 may include GPS coordinates associated with the shopping cart 150 and a distance (e.g., in feet or meters), a direction (e.g., north, south, east, or west), and an altitude (e.g., in feet or meters) of each item, aisle, service counter, etc. relative to one or more proximity sensors 158 mounted on the shopping cart 150.

Contextual information collected by one or more sensors 158 of each shopping cart 150 within a physical retail store may be associated with various types of data. Examples of data associated with the information include a name of the physical retail store, a geographic location associated with the physical retail store, a time at which the information was collected at the physical retail store, etc. For example, if a physical retail store is a grocery store that belongs to a chain of grocery stores, contextual information collected by sensors 158 included in a shopping cart 150 in the physical retail store may be associated with data including a name that identifies the chain and a geographic location (e.g., city and state) that identifies the specific physical retail store. In the above example, the contextual information also may be associated with a timestamp indicating a time at which it was collected.

In some embodiments, the shopping cart 150 further includes one or more cameras 154 that capture image data of the shopping cart's storage area and a user interface that the user can use to interact with the shopping cart 150. The cameras 154 capture image data of the shopping cart's storage area. The cameras 154 may capture two-dimensional or three-dimensional images of the shopping cart's contents. The cameras 154 are coupled to the shopping cart 150 such that the cameras 154 capture image data of the storage area from different perspectives. Thus, items in the shopping cart 150 are less likely to be overlapping in all camera perspectives. In some embodiments, the cameras 154 include embedded processing capabilities to process image data captured by the cameras 154. For example, the cameras 154 may be mobile industry processor interface (MIPI) cameras. The cameras 154 may be set to capture images from the area surrounding the shopping cart including the user of the cart. In some embodiments, at least one of the cameras 154 is directed outward, away from the shopping cart 150. In some embodiments, the shopping cart only has a single camera 105.

In some embodiments, the shopping cart 150 captures image data in response to detecting that an item is being added to the storage area. The shopping cart 150 may detect that an item is being added to the storage area 115 of the shopping cart 150 based on sensor data from sensors on the shopping cart 150. For example, the shopping cart 150 may detect that a new item has been added when the shopping cart 150 (e.g., load sensors) detects a change in the overall weight of the contents of the storage area 115 based on load data from load sensors. Similarly, the shopping cart 150 may detect that a new item is being added based on proximity data from proximity sensors indicating that something is approaching the storage area of the shopping cart 150. The shopping cart 150 may capture image data within a timeframe near when the shopping cart 150 detects a new item. For example, the shopping cart 150 may activate the cameras 154 and store image data in response to detecting that an item is being added to the shopping cart 150 and for some period of time after that detection.

The shopping cart 150 includes an on-cart computing system 152 that enables the user to perform an automated checkout through the shopping cart 150. The computing system includes a processor and a non-transitory computer-readable medium that stores instructions that may be executed by the processor. The computing system 152 also may include a display, a speaker, a microphone, a keypad, or a payment system (e.g., a credit card reader). The computing system 152 also includes a wireless network adapter that allows the computing system to communicate via the network 140.

The on-cart computing system 152 allows a customer at a brick-and-mortar store to complete a checkout process in which items are scanned and paid for without having to go through a human cashier at a point-of-sale station. The on-cart computing system 152 receives data describing a user's shopping trip in a store and generates a shopping list based on items that the user has selected. For example, the on-cart computing system 152 may receive data from cameras or sensors coupled to the shopping cart 150 and may determine, based on the data, which items the user has added to their cart.

The on-cart computing system 152 may use machine-learning models or computer-vision techniques to identify items that the user adds to the shopping cart. For example, the on-cart computing system 152 may apply a barcode detection model to images captured by a camera of the shopping cart to identify items based on the barcodes that are visible to the camera. The barcode detection model is a machine-learning model (e.g., a neural network) that is trained to identify item identifiers that are encoded in barcodes that are depicted in image data. The barcode detection model may be trained based on a set of training examples. Each of the training examples may include an image of a barcode and a label that indicates what item identifier encoded by the barcode. In some embodiments, the on-cart computing system 152 preprocesses the image before applying the barcode detection model to the image. For example, the on-cart computing system may rotate the image so that the barcode is aligned with a set direction or may crop an image of an item to a portion of the image that depicts the barcode. U.S. patent application Ser. No. 17/703,076, entitled "Image-Based Barcode Decoding" and filed Mar. 24, 2022, describes an example barcode detection model in accordance with some embodiments and is incorporated by reference.

The on-cart computing system also may store and apply an optical character recognition (OCR) model to the image.

An OCR model is a machine-learning model that converts typed, handwritten, or printed text depicted in images into machine-readable text. The on-cart computing system applies the OCR model to images captured by the cameras to identify items depicted in those images. For example, the on-cart computing system may generate a set of OCR text for an image. This OCR text is text that the OCR model has identified as being depicted in the image. The on-cart computing system uses the OCR text to identify items in images. For example, the on-cart computing system may apply another machine-learning model (e.g., a large language model) to the OCR text to predict which item is depicted in the image based on the OCR text.

In some embodiments, the on-cart computing system uses an item lookup table to identify items depicted in an image based on OCR text extracted from that image. The item lookup table stores a set of items that may be depicted in images captured by the cameras and corresponding text that is associated with each of the items. The on-cart computing system stores the item lookup table for use in identifying items. For example, the on-cart computing system may compare OCR text from an image to the corresponding text for each of the items to identify items depicted in images. The on-cart computing system may identify the item by identifying which item in the item lookup table has the most characters or words in common with the OCR text or which item has the longest sequence of characters in common with the OCR text. In some embodiments, rather than storing text in the item lookup table, the item lookup table stores embeddings that represent text associated with items. In these embodiments, the on-cart computing system may generate an embedding for OCR text and compare that embedding to the embeddings stored in the item lookup table to identify the item.

Furthermore, the on-cart computing system may store and apply an image embedding model to captured images to identify items. The image embedding model is a machine-learning model that is trained to generate embeddings for images captured by the cameras. The on-cart computing system applies the image embedding model to images captured by the cameras of the shopping cart and uses the embeddings to identify which items are depicted in the images. For example, the on-cart computing system may store embeddings that correspond to items that a user may place in the shopping cart. Each item may be associated with a single embedding or multiple embeddings. The on-cart computing system applies the image embedding model to images captured by the cameras and compares the generated embeddings to stored embeddings for items. The on-cart computing system identifies which item or items are depicted in an image based on how similar the generated embeddings are to the stored embeddings corresponding to the item(s). For example, the on-cart computing system may compute a distance, dot product, or cosine similarity between the embeddings to identify the item in the images. U.S. patent application Ser. No. 17/726,385, entitled "System for Item Recognition using Computer Vision" and filed Apr. 21, 2022, describes example methodologies for identifying items using a machine-learning model and is incorporated by reference.

Any of these models may be sensor fusion models that take sensor data as additional inputs. For example, a model may use weight data from a load sensor or proximity data from a proximity sensor as an additional input to predict an identifier for an item added to the shopping cart.

In some embodiments, a shopping cart 150 may include a display (e.g., a screen mounted to the on-cart computing system 152). For example, a display of a shopping cart 150 may correspond to a touch-screen display. The display may be a liquid crystal display (LCD), an in-plane switching liquid crystal display (IPS-LCD), an organic light-emitting diode (OLED), an active-matrix organic light-emitting diode (AMOLED), or any other suitable display type. A display of a shopping cart 150 may be used to display a user interface to a customer of a physical retail store, as further described below.

In some embodiments, a customer of a physical retail store may interact with a shopping cart 150. A customer may interact with a shopping cart 150 to initiate a shopping session and/or to authenticate the user, as further described below. In embodiments in which a shopping cart 150 includes a display, a customer may interact with the shopping cart 150 via the display. For example, if a display of a shopping cart 150 is a touch-screen display, a customer may initiate a shopping session by touching a button displayed in the display, in which touching the button submits a request to the shopping cart 150 to initiate a shopping session. The display may include one or more built-in accessories, such as speakers, microphones, etc. Although not shown in FIG. 1, in some embodiments, a shopping cart 150 also may include one or more accessories (e.g., speakers, microphones, buttons, dials, knobs, a bar code scanner, a camera, etc.) coupled to a storage area 156 included in the shopping cart 150, which a customer of a physical retail store may use to interact with the shopping cart 150. For example, if a display mounted on a shopping cart 150 is not a touch-screen display, a customer may initiate a shopping session by pushing a button located beside the display, in which pushing the button submits a request to the shopping cart 150 to initiate a shopping session. In this example, if the customer pushes the button, a confirmation of the request subsequently may be communicated to the customer (e.g., visually via the display and audibly via a speaker mounted on the storage area 156).

In some embodiments, the on-cart computing system 152 generates a shopping list for the user as the user adds items to the shopping cart 150. The shopping list is a list of items that the user has gathered in the storage area 115 of the shopping cart 150 and intends to purchase. The shopping list may include identifiers for the items that the user has gathered (e.g., stock keeping units (SKUs)) and a quantity for each item. When the user indicates that they are done shopping at the store, the on-cart computing system 152 interfaces with the remote system 130 to facilitate a transaction between the user and the store for the user to purchase their selected items. For example, the on-cart computing system 152 may receive payment information from the user through a user interface and transmit that payment information to the remote system 130.

The user interface of the on-cart computing system 152 may allow the user to adjust the items in their shopping list or to provide payment information for a checkout process. Additionally, the user interface may display a map of the store indicating where items are located within the store. In some embodiments, a user may interact with the user interface to search for items within the store, and the user interface may provide a real-time navigation interface for the user to travel from their current location to an item within the store. The user interface also may display additional content to a user, such as suggested recipes or items for purchase. In some embodiments, the on-cart computing system 152 may receive content from the remote system 130 to display to the user. For example, the on-cart computing system may receive item recommendations, recipe recommendations, or brand recommendations from the remote system 130.

The on-cart computing system may include a tracking system configured to track a position, an orientation, movement, or some combination thereof of the shopping cart 150 in an indoor environment. The tracking system may further include other sensors capable of capturing data useful for determining position, orientation, movement, or some combination thereof of the shopping cart. Other example sensors include, but are not limited to, an accelerometer, a gyroscope, etc. The tracking system may provide real-time location of the shopping cart to an online system and/or database. The location of the shopping cart may inform content to be displayed by the user interface. For example, if the shopping cart 150 is located in one aisle, the display can provide navigational instructions to a user to navigate them to a product in the aisle. In other example use cases, the display can provide suggested products or items located in the aisle based on the user's location.

One or more of a client device 110, a third-party system 130, the online concierge system 102, or a shopping cart 150 may be special-purpose computing devices configured to perform specific functions, as further described below in conjunction with FIGS. 2-6, and may include specific computing components such as processors, memories, communication interfaces, and/or the like. In some embodiments, a user can also interact with the shopping cart 150 or the remote system 130 through a client device 110.

In some embodiments, the on-cart computing system 152, the camera(s), and the sensors of the shopping cart are separately mounted to the shopping cart. Alternatively, the on-cart computing system 152, camera(s), and sensors may be contained within a single casing that is mounted to the shopping cart. This single casing may contain all of the components needed by the on-cart computing system 152 to perform the functionalities described herein. The single casing may be permanently mounted to the shopping cart or may be configured to be easily attached to or detached from the shopping cart. This latter embodiment may enable the on-cart computing system 152 to be recharged at a separate station from the shopping cart or may allow the computing system 152 to be easily mounted to pre-existing shopping carts, rather than requiring specially built shopping carts.

System Overview

Figure 2:
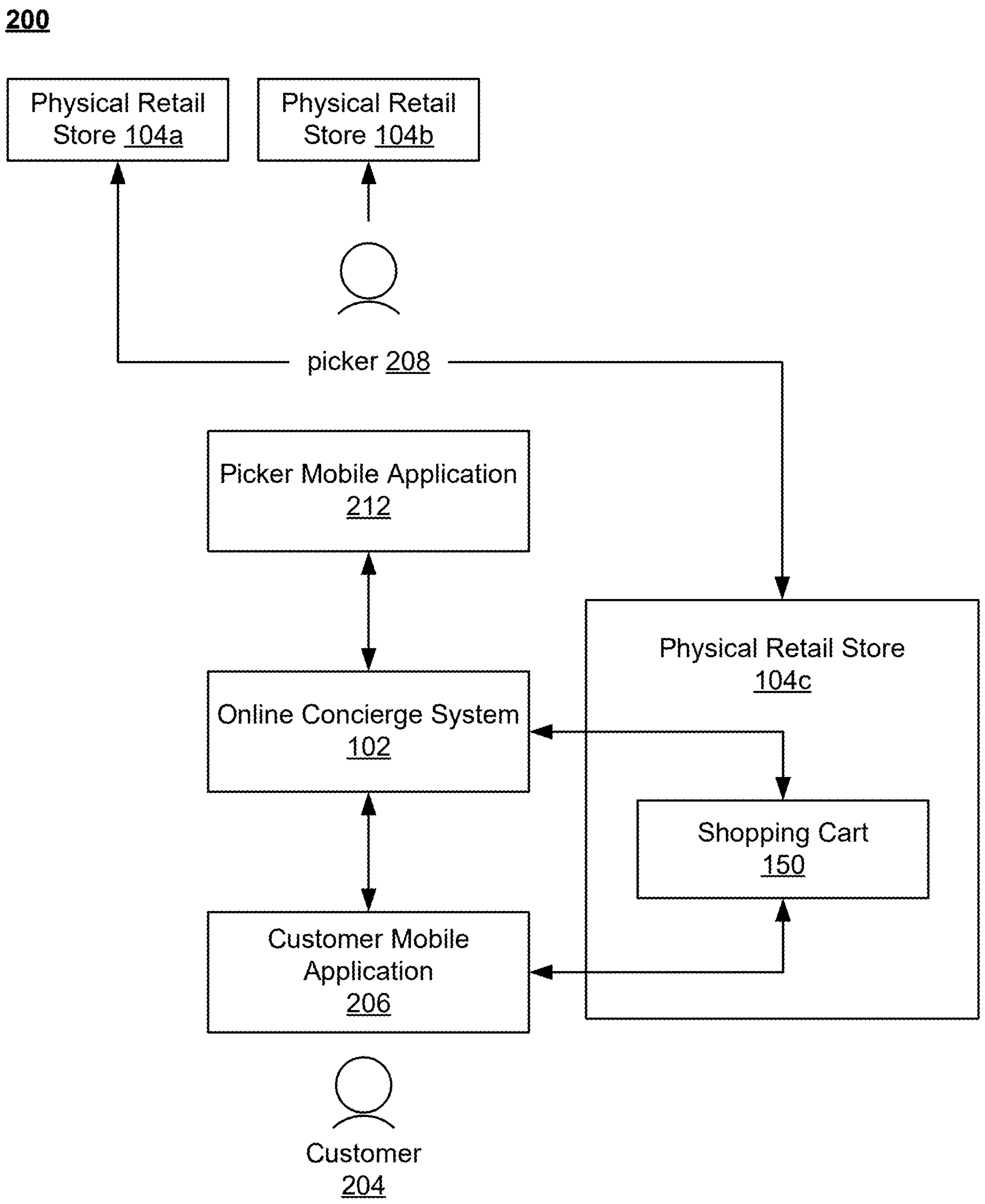
FIG. 2 illustrates an environment including one or more shopping carts located in physical retail stores and an online concierge system that may operate, according to one or more embodiments.

FIG. 2 illustrates an environment 200 including a shopping cart 150 and an online platform, such as an online concierge system 102, that may operate, according to one or more embodiments. The figures use like reference numerals to identify like elements. A letter after a reference numeral, such as "104*a*," indicates that the text refers specifically to the element having that particular reference numeral. A reference numeral in the text that is not followed by a letter, such as "104," refers to any or all of the elements in the figures bearing that reference numeral. For example, "104" in the text may refer to reference numerals "104*a*," "104*b*," and/or "104*c*" in the figures.

The environment 200 includes an online concierge system 102. The online concierge system 102 is configured to receive orders from one or more customers 204 (only one is shown for the sake of simplicity). An order specifies a list of goods (items or products) to be delivered to a customer 204, a location to which the goods are to be delivered, and a time window during which the goods should be delivered. In some embodiments, an order specifies one or more retailers from which goods should be purchased. A customer 204 may use a customer mobile application (CMA) 206, which is configured to communicate with the online concierge system 102, to place an order.

The online concierge system 102 is configured to transmit orders received from customers 204 to one or more pickers 208. A picker 208 may be a person (e.g., a contractor, an employee, etc.), an entity, or an autonomous device (e.g., a robot) enabled to fulfill orders received by the online concierge system 102. A picker 208 travels between a physical retail store and a delivery location (e.g., a customer's home or office) and may do so by car, truck, bicycle, scooter, foot, or via any other mode of transportation. In some embodiments, a delivery may be partially or fully automated, e.g., using a self-driving car. The environment 200 also includes three physical retail stores 104*a*, 104*b*, and 104*c* (while only three are shown for the sake of simplicity, the environment 200 may include hundreds of physical retail stores 104). The physical retail stores 104 may be physical retailers, such as grocery stores, discount stores, department stores, etc., or non-public physical retail stores 104 storing items that may be collected and delivered to customers 204. Each picker 208 fulfills an order received from the online concierge system 102 at one or more physical retail stores 104, delivers the order to a customer 204, or performs both fulfillment and delivery. In one embodiment, pickers 208 make use of a picker mobile application 212 which is configured to interact with the online concierge system 102.

One or more physical retail stores 104 within the environment 200 also may include one or more shopping carts 150 (only one is shown for the sake of simplicity). A shopping cart 150 may be configured to communicate various types of information with the online concierge system 102 and/or the CMA 206. Similarly, the online concierge system 102 and/or the CMA 206 may be configured to communicate various types of information with a shopping cart 150. In various embodiments, a shopping cart 150 may send a user interface to a display of a client device 110 associated with a customer 204 (e.g., in a push notification via the CMA 206). In some embodiments, the online concierge system 102 may send a user interface to the shopping cart 150 to be displayed to a customer 204 of a physical retail store.

In some embodiments, a shopping cart 150 may communicate information to the online concierge system 102 describing a performance metric associated with a content item presented to a customer 204 of a physical retail store. A performance metric (e.g., a conversion rate) associated with a content item may indicate whether one or more customers 204 presented with the content item subsequently performed an action associated with the content item. For example, if a content item is associated with a particular item within a physical retail store, a performance metric associated with the content item may indicate a rate at which customers 204 presented with the content item subsequently visited an aisle at which the item is located, placed the item in their storage area 156, and/or purchased the item.

A shopping cart 150 within a physical retail store also may communicate contextual information collected by one or more sensors 158 included in the shopping cart 150 to the online concierge system 102 and/or the CMA 206. For example, suppose that a customer 204 interacts with a shopping cart 150 to log in to an account associated with the customer 204 maintained in the online concierge system 102. In this example, the shopping cart 150 may then communicate a route of the customer 204 within a physical retail store based on information describing multiple locations of a storage area 156 included in the shopping cart 150 within the physical retail store during a shopping session. In the above example, the shopping cart 150 also may communicate locations within the physical retail store at which the storage area 156 stopped and information describing items the customer 204 added to the storage area 156 and subsequently purchased during the shopping session.

Example Shopping Cart

Figure 3:
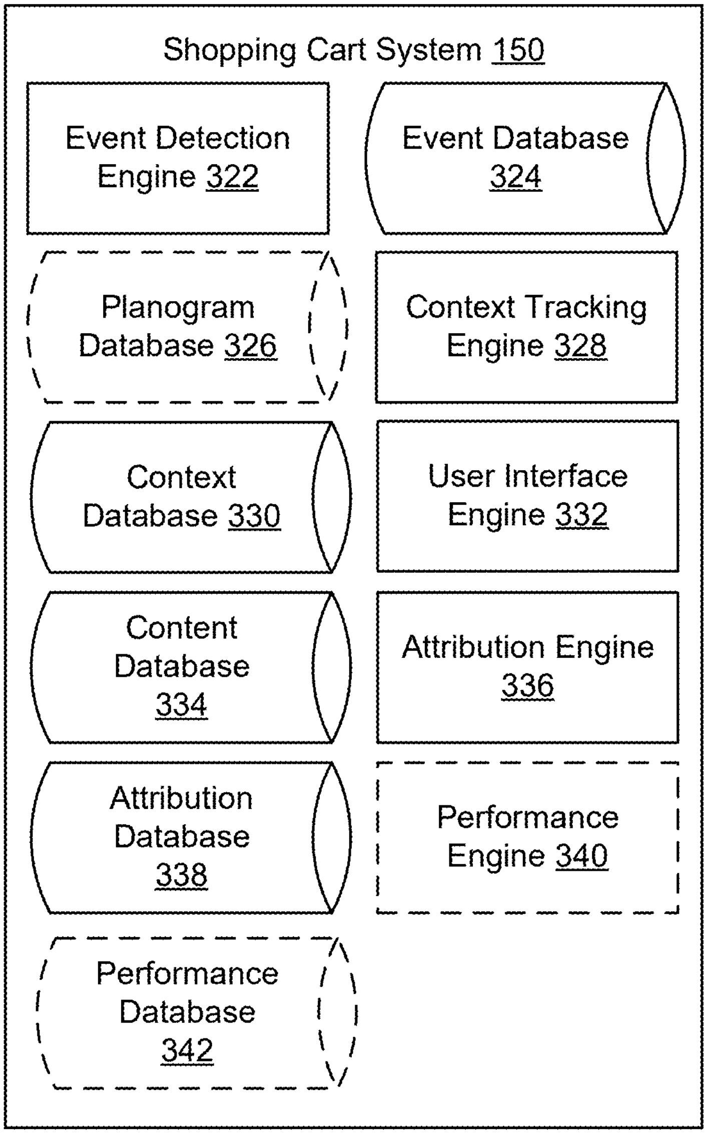
FIG. 3 is an example architecture of a shopping cart according to one or more embodiments.

FIG. 3 is a diagram of a shopping cart 150 according to one or more embodiments. In various embodiments, a shopping cart 150 may include different or additional modules than those described in conjunction with FIG. 3. Furthermore, in some embodiments, a shopping cart 150 may include fewer modules than those described in conjunction with FIG. 3.

The shopping cart 150 includes an event detection engine 322, which detects various types of events associated with a customer 204 within a physical retail store. Examples of events that may be detected by the event detection engine 322 include the initiation of a shopping session within a physical retail store by a customer 204 of the physical retail store, stopping a storage area 156 within a threshold distance of an item within the physical retail store for at least a threshold amount of time, moving a storage area 156 within a threshold distance of an item within the physical retail store, picking up an item from a specific location within the physical retail store (e.g., a promotional display), adding an item to a storage area 156, purchasing an item from the physical retail store, concluding a shopping session, or any other types of events that may be associated with a customer 204 within a physical retail store. For example, the event detection engine 322 may detect the initiation of a shopping session by a customer 204 of a physical retail store upon receiving a reading from one or more sensors 158 (e.g., motion or velocity sensors 158) of a shopping cart 150 or upon receiving one or more interactions by the customer 204 with a display and/or one or more accessories (e.g., buttons, dials, knobs, microphones, a bar code scanner, a camera, etc.) included in the shopping cart 150 corresponding to a request to initiate a shopping session. Similarly, the event detection engine 322 may detect the conclusion of a shopping session upon receiving no reading from one or more sensors 158 (e.g., motion or velocity sensors 158) included in the shopping cart 150 for at least a threshold amount of time or upon receiving one or more interactions by a customer 204 with a display and/or one or more accessories included in the shopping cart 150 corresponding to a request to conclude a shopping session. In embodiments in which an event detected by the event detection engine 322 corresponds to stopping a storage area 156 within a threshold distance of an item within a physical retail store for at least a threshold amount of time, the threshold amount of time and/or distance may be determined by a machine-learned model (e.g., a model trained based on anonymous aggregated data describing customer behavior associated with shopping carts 150 when deciding whether to purchase items).

In some embodiments, a shopping session may be initiated upon authentication of a customer 204. In such embodiments, information provided by the customer 204 may be used by the event detection engine 322 and/or the online concierge system 102 to authenticate the customer 204. Examples of such information include a username and password combination, biometric information (e.g., a fingerprint), or any other suitable information that may be used to authenticate the customer 204. For example, information from a customer 204 corresponding to login credentials for the online concierge system 102 may be received by the event detection engine 322 via a touch-screen display included in the shopping cart 150. In this example, the event detection engine 322 may communicate the login credentials to the online concierge system 102, which may authenticate the customer 204 if the credentials match those of a customer 204 of the online concierge system 102 stored in the user database 314. Alternatively, in the above example, the event detection engine 322 may access the user database 314 of the online concierge system 102 and authenticate the customer 204 if the credentials match those of a customer 204 of the online concierge system 102 stored in the user database 314. As an additional example, a quick response (QR) code that uniquely identifies a customer 204 in the online concierge system 102 may be generated by the online concierge system 102 and displayed on a client device 110 associated with the customer 204 (e.g., via the CMA 206). In this example, the customer 204 may be authenticated if a camera included in the shopping cart 150 scans the QR code and the event detection engine 322 communicates the QR code to the online concierge system 102, which then authenticates the customer 204. In embodiments in which a shopping session is initiated upon authentication of a customer 204, the shopping session may be linked to a user profile of the customer 204 upon authentication of the customer 204. For example, once a customer 204 is authenticated, information describing a shopping session may be stored in the event database 324 (described below) and included among user profile information associated with the customer 204.

The event detection engine 322 may detect an event associated with a customer 204 at a physical retail store based on contextual information associated with a storage area 156 tracked by the context tracking engine 328, described below, and/or a planogram associated with the physical retail store stored in the planogram database 326, also described below. For example, suppose that a particular item is placed in two different locations within a physical retail store, in which one location is its normal location within an aisle and the other location is a promotional display at the end of a different aisle. In this example, the event detection engine 322 may detect an event corresponding to adding the item to a storage area 156 included in the shopping cart 150, in which the event detection engine 322 also detects the location at which the item was added to the storage area 156 (e.g., based on the planogram associated with the physical retail store). As an additional example, the event detection engine 322 may detect the conclusion of a shopping session based on contextual information tracked by the context tracking engine 328 indicating a storage area 156 included in the shopping cart 150 is within a threshold distance of a shopping cart return area or that the storage area 156 has passed through a checkout line within a physical retail store.

The event detection engine 322 may store information describing one or more events associated with one or more customers 204 of a physical retail store. In some embodiments, this information may be stored in the event database 324 of the shopping cart 150. In various embodiments, this information also or alternatively may be communicated to and stored in the online concierge system 102 (e.g., in the transaction records database 308 and/or the training datasets 320). The event detection engine 322 may store information describing an event in association with information identifying a customer 204 associated with the event (e.g., based on login credentials provided by the customer 204), information identifying a physical retail store at which the event was detected, a time at which the event was detected, a location within the physical retail store at which the event was detected, or any other information associated with the event. For example, suppose that the event detection engine 322 detects that a customer 204 added an item to a storage area 156 included in the shopping cart 150 while shopping at a physical retail store. In this example, information describing the event, such as the type of event (i.e., adding an item to the storage area 156) and information describing the item (e.g., the type of item, a size of the item, a brand of the item, etc.) may be stored (e.g., in the event database 324, the transaction records database 308, and/or the training datasets 320). In the above example, the information describing the event may be stored in association with information identifying the physical retail store (e.g., its name and address), a time at which the item was added to the storage area 156, an aisle within the physical retail store in which the customer 204 added the item to the storage area 156, and a username associated with the customer 204 in the online concierge system 102.

In some embodiments, the shopping cart 150 further includes a planogram database 326. The planogram database 326 stores one or more planograms that each are associated with a physical retail store and describes the placement of each of multiple items within the physical retail store. A planogram associated with a physical retail store may indicate the placement of items on shelves, in display cases, in aisles, or within any other suitable organizational elements that are used to organize the items within the physical retail store. A planogram also may include a layout of a physical retail store, which describes the location of organizational elements relative to each other and to building elements of the physical retail store (e.g., walls, doors, stairs, elevators, etc.). In some embodiments, a planogram of a physical retail store stored in the planogram database 326 may be updated (e.g., periodically, upon updating the placement of an item within the physical retail store or a layout of the physical retail store, etc.). In some embodiments, the planogram database 326 also or alternatively may be included in the online concierge system 102. In such embodiments, a planogram of a physical retail store may be updated by the online concierge system 102 upon receiving information from the physical retail store describing the update.

The shopping cart 150 further includes a context tracking engine 328. The context tracking engine 328 tracks contextual information associated with a storage area 156 (or a similar object used to carry items collected during a shopping session) included in the shopping cart 150, in which the contextual information is received by one or more sensors 158 included in the shopping cart 150. As described above, one or more sensors 158 included in the shopping cart 150 may be capable of identifying physical objects (e.g., items, organizational elements, and/or building elements) within a physical retail store. As also described above, contextual information associated with a storage area 156 may describe one or more locations of the storage area 156 within a physical retail store and/or a set of items within the storage area 156. For example, contextual information associated with the storage area 156 describing a location of the storage area 156 within a physical retail store may include GPS coordinates collected by a GPS sensor 158 coupled to the storage area 156. In this example, contextual information collected by one or more proximity sensors 158 coupled to the storage area 156 also may include a distance (e.g., in feet or meters), a direction (e.g., north, south, east, or west), and an altitude (e.g., in feet or meters) of one or more items, aisles, service counters, etc. within the physical retail store relative to the storage area 156. Continuing with this example, contextual information collected by sensors 158 (e.g., cameras) mounted onto the storage area 156 that face the interior of the storage area 156 also may include information identifying one or more items (e.g., retail items) within the storage area 156.

In some embodiments, the context tracking engine 328 may track contextual information associated with a storage area 156 within a physical retail store by comparing information collected by one or more sensors 158 included in the shopping cart 150 to a planogram associated with the physical retail store. For example, if one or more sensors 158 included in the shopping cart 150 correspond to one or more cameras, the context tracking engine 328 may compare video or image data collected by the cameras to the planogram associated with a physical retail store and determine the location of the storage area 156 based on the comparison. In this example, if items identified in the video or image data and their placement within the physical retail store have at least a threshold measure of similarity to a portion of the planogram, the context tracking engine 328 may determine that the storage area 156 is at the location within the physical retail store corresponding to the portion of the planogram.

Contextual information associated with a storage area 156 tracked by the context tracking engine 328 also may describe a state of the storage area 156. As described above, the state of a storage area 156 may indicate whether the storage area 156 is moving or stationary. In some embodiments, the state of a storage area 156 also may indicate whether the storage area 156 is moving less than a threshold speed, whether the storage area 156 has moved less than a threshold distance within a specified amount of time, whether the storage area 156 has reversed directions, a velocity of the storage area 156, an orientation of the storage area 156, or any other suitable information describing a state of the storage area 156.

Contextual information tracked by the context tracking engine 328 may be associated with various types of data. Examples of data that may be associated with the contextual information include a name of a physical retail store at which the contextual information was collected, a geographic location associated with the physical retail store, a time at which the information was collected at the physical retail store, information describing a shopping session (e.g., time of day) during which the contextual information was collected, information identifying a customer 204 associated with the shopping session (e.g., based on information provided to authenticate the customer 204), etc. For example, if a physical retail store is a grocery store that belongs to a chain of grocery stores, contextual information tracked by the context tracking engine 328 may be associated with data including a name that identifies the chain and a geographic location (e.g., city and state) that identifies the specific physical retail store. In the above example, the contextual information also may be associated with a timestamp indicating a time at which it was collected by sensors 158 included in the shopping cart 150.

In some embodiments, the context tracking engine 328 may store contextual information it tracks and/or data associated with the contextual information in the context database 330. In embodiments in which contextual information stored in the context database 330 includes information identifying a customer 204 associated with the contextual information, this information may be included in a user profile associated with the customer 204. For example, if a customer 204 provides information that uniquely identifies the customer 204 upon initiating a shopping session and the information is used to authenticate the customer 204, information identifying the customer 204 (e.g., a username) may be stored in the context database 330 in association with contextual information tracked by the context tracking engine 328 during the shopping session. In this example, the contextual information may later be retrieved in association with other user profile information associated with the customer 204.

In various embodiments, the context tracking engine 328 also may communicate contextual information it tracks and/or data associated with the contextual information to the online concierge system 102. In such embodiments, the online concierge system 102 may use this information for various purposes. In some embodiments, the online concierge system 102 may use this information to customize an experience of a customer 204 in the online concierge system 102. For example, if a customer 204 of a physical retail store is also a customer 204 of the online concierge system 102, the online concierge system 102 may customize an online version of the physical retail store based on a route commonly traversed by the customer 204 through the physical retail store.

The shopping cart 150 further includes a user interface engine 332. The user interface engine 332 identifies an opportunity to present content to a customer 204 of a physical retail store based in part on contextual information associated with a storage area 156 included in the shopping cart 150. In various embodiments, the user interface engine 332 may receive contextual information associated with a storage area 156 from the context tracking engine 328, while in other embodiments, the user interface engine 332 may retrieve the contextual information from the context database 330. In some embodiments, the user interface engine 332 may identify an opportunity to present content to a customer 204 upon detecting that a storage area 156 has been stationary for at least a threshold amount of time. For example, the user interface engine 332 may receive contextual information from the context tracking engine 328 describing a state of the storage area 156 being used during a shopping session associated with a customer 204 of a physical retail store. In this example, if the contextual information indicates that the storage area 156 has been stationary for at least a threshold amount of time, the user interface engine 332 may identify an opportunity to present content to the customer 204. In some embodiments, the user interface engine 332 also or alternatively may identify an opportunity to present content to a customer 204 upon detecting one or more specific items within a storage area 156. For example, if the contextual information indicates that an item has been added to a storage area 156, the user interface engine 332 may identify an opportunity to present content associated with the item to the customer 204.

The user interface engine 332 also identifies a set of content items associated with one or more items within a physical retail store to include in a user interface to be sent for display to a customer 204 of the physical retail store. In some embodiments, the user interface engine 332 may identify the set of content items using a machine-learned model. Furthermore, the user interface engine 332 may identify the set of content items based in part on contextual information associated with a storage area 156 included in the shopping cart 150. In embodiments in which the user interface engine 332 identifies an opportunity to present content to a customer 204 upon detecting that a storage area 156 has been stationary for at least a threshold amount of time, a set of content items identified by the user interface engine 332 may be associated with one or more items within a threshold distance of the storage area 156. For example, the user interface engine 332 may access contextual information stored in the context database 330 describing a location of a storage area 156 within a physical retail store while the storage area 156 has been stationary for at least a threshold amount of time. In this example, the user interface engine 332 may then access the planogram database 326 to retrieve a planogram associated with the physical retail store and compare the location of the storage area 156 to the planogram. Continuing with this example, the user interface engine 332 may then identify one or more items within the physical retail store within a threshold distance of the location of the storage area 156 and access the content database 334 (described below) to identify one or more content items associated with the identified item(s). In embodiments in which the user interface engine 332 identifies an opportunity to present content to a customer 204 upon detecting one or more specific items within a storage area 156, a set of content items identified by the user interface engine 332 may be associated with the item(s). For example, upon detecting that an item has been added to a storage area 156 (e.g., by the event detection engine 322), the user interface engine 332 may access contextual information stored in the context database 330 describing one or more items within the storage area 156. In this example, if the contextual information indicates that an item within the storage area 156 is spaghetti, the user interface engine 332 may identify a set of content items associated with spaghetti.

In some embodiments, the user interface engine 332 also may identify a set of content items associated with one or more items within a physical retail store to include in a user interface to be sent for display to a customer 204 of the physical retail store based in part on user profile information associated with the customer 204. In such embodiments, the user interface engine 332 may identify the set of content items based on the customer's geographic location, age, gender, shopping preferences, favorite items, dislikes, historical information associated with the customer 204 (e.g., in a physical retail store or the online concierge system 102), or any other information included in the customer's user profile. For example, suppose that a user profile of a customer 204 indicates that the customer 204 dislikes nuts because they are allergic to them. In this example, if one or more sensors 158 of the shopping cart 150 identify an item added to a storage area 156 being used by the customer 204 and the item includes an ingredient corresponding to a nut, a content item including a warning about the contents of the item may be identified by the user interface engine 332. As an additional example, suppose that historical information associated with a customer 204 indicates that the customer 204 usually purchases a particular item during each shopping session or according to a consistent cadence, such that the customer 204 is likely to purchase the item during a current shopping session. In this example, if contextual information associated with a storage area 156 included in the shopping cart 150 being used by a customer 204 indicates that the storage area 156 is in a checkout line and the item is not within the storage area 156, a content item reminding the customer 204 about the item may be identified by the user interface engine 332. In embodiments in which the user interface engine 332 identifies content items based on user profile information associated with a customer 204, the user interface engine 332 may access user profile information stored in the online concierge system 102 (e.g., in the user database 314, in the transaction records database 308, and/or the training datasets 320) and/or the online concierge system 102 may communicate the user profile information to the user interface engine 332.

In various embodiments, the user interface engine 332 also may identify a set of content items associated with one or more items within a physical retail store to include in a user interface to be sent for display to a customer 204 of the physical retail store based in part on a time of a shopping session. In such embodiments, the user interface engine 332 may identify a content item included among the set based on seasonal demand for an item associated with the content item, a day of the week, a time of day, etc. For example, during early-morning shopping sessions, the user interface engine 332 may identify one or more content items associated with breakfast items (e.g., pastries, coffee, tea, etc.). As an additional example, a month prior to Thanksgiving, the user interface engine 332 may identify content items associated with items related to Thanksgiving (e.g., Thanksgiving recipes, promotions for ham or gravy, etc.).

In some embodiments, the user interface engine 332 also may identify a set of content items associated with one or more items within a physical retail store to include in a user interface to be sent for display to a customer 204 of the physical retail store based in part on information associated with the set of content items and/or information associated with one or more items associated with the content items. In various embodiments, each content item may be associated with a value that the user interface engine 332 may use to identify the set of content items to include in the user interface, such that content items associated with higher values are more likely to be identified by the user interface engine 332 than content items associated with lower values. For example, if content items correspond to advertisements, content items associated with higher bid amounts may be more likely to be identified by the user interface engine 332 for inclusion in the user interface than content items associated with lower bid amounts. As an additional example, content items associated with higher-priced items and/or items with higher inventory counts may be more likely to be identified by the user interface engine 332 for inclusion in the user interface than content items associated with lower-priced items and/or items with lower inventory counts.

In some embodiments, the user interface engine 332 also may identify a set of content items associated with one or more items within a physical retail store to include in a user interface to be sent for display to a customer 204 of the physical retail store based in part on information received from the online concierge system 102. For example, suppose that the online concierge system 102 presents various content items (e.g., articles, recipes, etc.) to its customers 204 via the CMA 206. In this example, the online concierge system 102 may communicate information to the user interface engine 332 identifying certain content items that are trending among customers 204 of the online concierge system 102. In the above example, the trending content items may be identified by the user interface engine 332 for inclusion in a user interface to be sent for display to a customer 204 of a physical retail store (e.g., if contextual information associated with a storage area 156 used by the customer 204 indicates the storage area 156 is within a threshold distance of one or more items associated with the trending content items).

In some embodiments, the user interface engine 332 may not identify a content item associated with an item within a physical retail store to include in a user interface to be sent for display to a customer 204 based on a type associated with the content item and contextual information associated with a storage area 156. In various embodiments, the user interface engine 332 may not identify a content item if the content item is unlikely to encourage a customer 204 to perform an action associated with an item (e.g., to purchase the item). For example, suppose that a content item corresponds to an advertisement for spaghetti sauce and contextual information associated with a storage area 156 being used by a customer 204 within a physical retail store indicates that spaghetti sauce is included among the items within the storage area 156. In this example, the content item may not be included among a set of content items identified by the user interface engine 332 to include in a user interface to be sent for display to the customer 204 since the customer 204 is already likely to purchase the spaghetti sauce if it is in their storage area 156. However, in the above example, if the content item is a coupon for the spaghetti sauce, the content item may be included among the set of content items identified by the user interface engine 332 since the customer 204 is more likely to purchase more of the spaghetti sauce with the coupon.

Once the user interface engine 332 identifies a set of content items associated with one or more items within a physical retail store to include in a user interface to be sent for display to a customer 204 of the physical retail store, the user interface engine 332 also generates the user interface including the set of content items. For example, if the user interface engine 332 identifies multiple content items, the user interface engine 332 may generate a user interface with the content items organized in a grid format or in a horizontally or vertically scrollable carousel format. In embodiments in which the user interface engine 332 identifies multiple content items to include in a user interface to be sent for display to a customer 204, the content items may be arranged based on a likelihood that the customer 204 subsequently will perform an action associated with each content item. For example, if a user interface includes multiple content items, a content item associated with an action that a customer 204 is most likely to perform is arranged in a most prominent position of the user interface and a content item associated with an action that the customer 204 is least likely to perform is arranged in a least prominent position. In such embodiments, the user interface engine 332 may determine the likelihood associated with each content item based on information included in a user profile of the customer 204. For example, the user interface engine 332 may determine a likelihood that a customer 204 will perform an action associated with a content item based on information included in a user profile of the customer 204 maintained in the attribution database 338 (described below). In this example, the information included in the user profile may describe whether events associated with similar actions performed by the customer 204 were attributed to including similar content items in a user interface previously sent to a display associated with the customer 204.

Once the user interface engine 332 generates a user interface, the user interface engine 332 sends the user interface to a display associated with a customer 204. In some embodiments, the user interface engine 332 sends the user interface to a display included in a client device 110 associated with a customer 204. In various embodiments, the user interface engine 332 also or alternatively sends the user interface to a display included in the shopping cart 150.

The shopping cart 150 further includes a content database 334. The content database 334 stores content items associated with items within one or more physical retail stores 104. The content database 334 may store various types of content items, such as product information associated with an item (e.g., source/manufacturing information, warnings about materials/ingredients), a promotion for an item, a coupon for an item, a set of instructions for using an item, a suggested use for an item, an advertisement for an item, a reminder about an item, a video, an image, or a social media post that features an item, etc. For example, if an item is a retail item sold at a grocery store, a content item corresponding to product information associated with the item may include nutritional information associated with the item, information indicating whether the item is organic, where it is made, etc. As an additional example, a content item associated with an item in a grocery store may correspond to a recipe in which the item is included as an ingredient. As yet another example, a content item associated with an item may correspond to a reminder to purchase the item if a customer 204 often purchases the item during shopping sessions or if the item is commonly paired with another item that is in a storage area 156 being used by a customer 204. In some embodiments, one or more content items stored in the content database 334 may be associated with multiple items within a physical retail store. For example, a content item corresponding to a recipe may be associated with multiple items that each correspond to an ingredient for the recipe.

The shopping cart 150 further includes an attribution engine 336. The attribution engine 336 determines whether to attribute an event detected by the event detection engine 322 to including a content item in a user interface sent for display to a customer 204 of a physical retail store. The attribution engine 336 may make the determination based on a first time at which the user interface was sent to a display associated with the customer 204 and a second time at which the event was detected by the event detection engine 322. In some embodiments, once a user interface is sent to a display associated with a customer 204 during a shopping session, the attribution engine 336 may determine that any subsequent events detected by the event detection engine 322 during the shopping session may be attributed to including a content item associated with the event in the user interface. For example, suppose that the user interface engine 332 sends a user interface to a display associated with a customer 204, in which the user interface includes a content item corresponding to a coupon for an item. In this example, the attribution engine 336 may determine that the addition of the item to a storage area 156 by the customer 204 and the purchase of the item by the customer 204 subsequently detected by the event detection engine 322 should be attributed to including the content item in the user interface sent for display to the customer 204.

In some embodiments, once the attribution engine 336 determines whether to attribute an event detected by the event detection engine 322 to including a content item in a user interface sent for display to a customer 204 of a physical retail store, the attribution engine 336 may store information describing the determination in the attribution database 338. Information stored in the attribution database 338 may include information describing a content item included in a user interface sent to a display associated with a customer 204 of a physical retail store, information describing a time at which the user interface was sent to the display, information describing the display (e.g., whether the display is included in a client device 110 or the shopping cart 150), information identifying the customer 204, information describing an event that was or was not attributed to including the content item in the user interface (e.g., a time at which the event was detected, information identifying an item associated with the event, etc.), or any other suitable information describing a determination made by the attribution engine 336. In embodiments in which information stored in the attribution database 338 includes information identifying a customer 204, the information may be included among user profile information associated with the customer 204.

In some embodiments, the shopping cart 150 further includes a performance engine 340. The performance engine 340 computes a performance metric associated with a content item based in part on a determination by the attribution engine 336 whether to attribute an event to including the content item in a user interface sent to a display associated with a customer 204 of a physical retail store. The performance metric may correspond to a conversion rate, a click-through rate (CTR), or any other suitable metric that describes a performance of a content item. For example, a performance metric associated with a content item may correspond to a conversion rate, in which the conversion rate describes a rate at which customers 204 of a physical retail store presented with the content item during their shopping sessions subsequently added an item associated with the content item to their shopping carts 150. As an additional example, a performance metric associated with a content item may correspond to a click-through rate, in which the click-through rate describes a rate at which customers 204 presented with the content item clicked on the content item to view a recipe associated with an item. The performance engine 340 may be configured to store information describing a performance metric in the performance database 342. Furthermore, in some embodiments, the performance engine 340 and/or the performance database 342 also or alternatively may be included in the online concierge system 102. In embodiments in which the performance engine 340 is included in the online concierge system 102, a determination by the attribution engine 336 whether to attribute an event to including a content item in a user interface sent to a display associated with a customer 204 may be communicated to the online concierge system 102 and used by the performance engine 340 to compute a performance metric associated with the content item. In such embodiments, the performance engine 340 of the online concierge system 102 may access the attribution engine 336 of the shopping cart 150 to retrieve the determination or the attribution engine 336 of the shopping cart 150 may communicate the determination to the performance engine 340 of the online concierge system 102.

Example Online Concierge System

Figure 4:
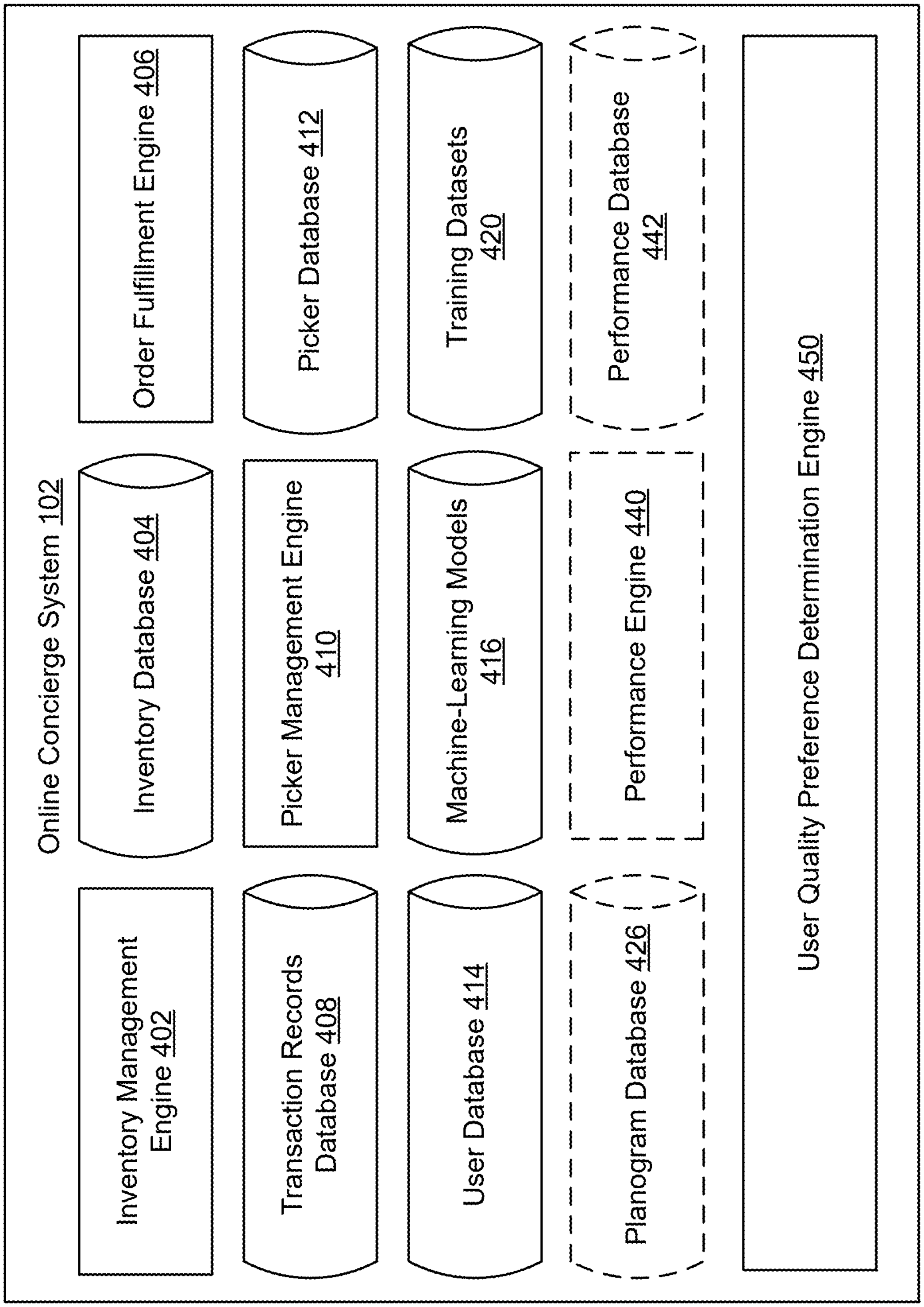
FIG. 4 is an example architecture of an online concierge system according to one or more embodiments.

FIG. 4 is a diagram of an online concierge system 102 according to one or more embodiments. In various embodiments, an online concierge system 102 may include different or additional modules than those described in conjunction with FIG. 4. Furthermore, in some embodiments, an online concierge system 102 includes fewer modules than those described in conjunction with FIG. 4.

The online concierge system 102 includes an inventory management engine 402, which interacts with inventory systems associated with each physical retail store. In one embodiment, the inventory management engine 402 requests and receives inventory information maintained by a physical retail store. The inventory management engine 402 also may receive inventory information from one or more shopping carts 150 included in a physical retail store, in which the inventory information is collected by one or more sensors 158 included in the shopping cart(s) 150. The inventory of each physical retail store is unique and may change over time. The inventory management engine 402 monitors changes in inventory for each participating physical retail store. The inventory management engine 402 is also configured to store inventory records in an inventory database 404. The inventory database 404 may store information in separate records—one for each participating physical retail store—or may consolidate or combine inventory information into a unified record. Inventory information includes attributes of items that include both qualitative and quantitative information about the items, including size, color, weight, SKU, serial number, etc. In one embodiment, the inventory database 404 also stores purchasing rules associated with each item, if they exist. For example, age-restricted items such as alcohol and tobacco are flagged accordingly in the inventory database 404. Additional inventory information useful for predicting the availability of items may also be stored in the inventory database 404. For example, for each item-store combination (a particular item at a particular physical retail store), the inventory database 404 may store a time that the item was last found, a time that the item was last not found (e.g., if a picker 208 looked for the item but could not find it), a rate at which the item is found, and a popularity of the item.

For each item, the inventory database 404 identifies one or more attributes of the item and corresponding values for each attribute of the item. For example, the inventory database 404 includes an entry for each item offered by a physical retail store, in which an entry for an item includes an item identifier that uniquely identifies the item. The entry includes different fields, with each field corresponding to an attribute of the item. A field of an entry includes a value for an attribute corresponding to the field, allowing the inventory database 404 to maintain values of different attributes for various items.

In various embodiments, the inventory management engine 402 maintains a taxonomy of items offered for purchase by one or more physical retail stores 104. For example, the inventory management engine 402 receives an item catalog from a physical retail store identifying items offered for purchase by the physical retail store. From the item catalog, the inventory management engine 402 determines a taxonomy of items offered by the physical retail store, in which different levels of the taxonomy provide different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.) with the category. Thus, the taxonomy maintains associations between a category and specific items offered by the physical retail store matching the category. In some embodiments, different levels of the taxonomy identify items with differing levels of specificity based on any suitable attribute or combination of attributes of the items. For example, different levels of the taxonomy specify different combinations of attributes of items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels of the taxonomy include fewer details about items, so greater numbers of items are included in higher levels (e.g., higher levels include a greater number of items satisfying a broader category). Similarly, lower levels of the taxonomy include greater details about items, so fewer numbers of items are included in the lower levels (e.g., lower levels include a fewer number of items satisfying a more specific category). The taxonomy may be received from a physical retail store in various embodiments. In other embodiments, the inventory management engine 402 applies a trained classification model to an item catalog received from a physical retail store to include different items in levels of the taxonomy, so application of the trained classification model associates specific items with categories corresponding to levels within the taxonomy.

Inventory information provided by the inventory management engine 402 may supplement training datasets 420. Inventory information provided by the inventory management engine 402 may not necessarily include information about the outcome of fulfilling a delivery order associated with the item, whereas the data within the training datasets 420 is structured to include an outcome of fulfilling a delivery order (e.g., if an item in an order was or was not collected).

In some embodiments, the online concierge system 102 includes an order fulfillment engine 406 which is configured to synthesize and display an ordering interface to each customer 204 (for example, via the customer mobile application 206). The order fulfillment engine 406 is also configured to access the inventory database 404 in order to determine which items are available at which physical retail store. The order fulfillment engine 406 determines a sale price for each item ordered by a customer 204. Prices set by the order fulfillment engine 406 may or may not be identical to in-store prices determined by retailers (which is the price that customers 204 and pickers 208 would pay at the physical retail stores 104). The order fulfillment engine 406 also facilitates transactions associated with each order. In one embodiment, the order fulfillment engine 406 charges a payment instrument associated with a customer 204 when he/she places an order. The order fulfillment engine 406 may transmit payment information to an external payment gateway or payment processor. The order fulfillment engine 406 stores payment and transactional information associated with each order in a transaction records database 408.

In various embodiments, the order fulfillment engine 406 generates and transmits a search interface to a client device 110 of a customer 204 for display via the customer mobile application 206. The order fulfillment engine 406 receives a query comprising one or more terms from a customer 204 and retrieves items satisfying the query, such as items having descriptive information matching at least a portion of the query. In various embodiments, the order fulfillment engine 406 leverages item embeddings for items to retrieve items based on a received query. For example, the order fulfillment engine 406 generates an embedding for a query and determines measures of similarity between the embedding for the query and item embeddings for various items included in the inventory database 404.

In some embodiments, the order fulfillment engine 406 also shares order details with physical retail stores 104. For example, after successful fulfillment of an order, the order fulfillment engine 406 may transmit a summary of the order to the appropriate physical retail stores 104. Details of an order may indicate the items purchased, a total value of the items, and in some cases, an identity of a picker 208 and a customer 204 associated with the order. In one embodiment, the order fulfillment engine 406 pushes transaction and/or order details asynchronously to retailer systems. This may be accomplished via the use of webhooks, which enable programmatic or system-driven transmission of information between web applications. In another embodiment, retailer systems may be configured to periodically poll the order fulfillment engine 406, which provides details of all orders which have been processed since the last request.

The order fulfillment engine 406 may interact with the picker management engine 410, which manages communication with and utilization of pickers 208. In one embodiment, the picker management engine 410 receives a new order from the order fulfillment engine 406. The picker management engine 410 identifies the appropriate physical retail store to fulfill the order based on one or more parameters, the contents of the order, the inventory of the physical retail stores 104, and the proximity of the physical retail stores 104 to the delivery location. The picker management engine 410 then identifies one or more appropriate pickers 208 to fulfill the order based on one or more parameters, such as the pickers' proximity to the appropriate physical retail store (and/or to the customer 204), his/her familiarity level with that particular physical retail store, etc. Additionally, the picker management engine 410 accesses a picker database 412 which stores information describing each picker 208, such as his/her name, gender, rating, previous shopping history, etc.

As part of fulfilling an order, the order fulfillment engine 406 and/or picker management engine 410 may access a user database 414, which stores information describing each customer 204. In some embodiments, information stored in the user database 414 describing each customer 204 is included in a user profile of the customer 204. This information may include each customer's name, geographic location (e.g., home or business address), age, gender, shopping preferences, favorite items, dislikes, stored payment instruments, profile picture, etc.

A user profile of a customer 204 stored in the user database 414 also may include historical information associated with the customer 204. In some embodiments, historical information associated with a customer 204 may describe one or more shopping trips of the customer 204 to a physical retail store. In such embodiments, the historical information may be collected by one or more sensors 158 included in a shopping cart 150 within the physical retail store. For example, historical information associated with a customer 204 describing a shopping trip to a physical retail store may include information identifying the physical retail store, a time and duration of a shopping session at the physical retail store, a route within the physical retail store traveled by the customer 204, amounts of time that the customer 204 stopped at particular locations within the physical retail store, information describing each location at which the customer 204 stopped, etc. In this example, the historical information associated with the customer 204 also may include information identifying one or more content items associated with items within the physical retail store sent for display to the customer 204 while at the physical retail store, a time at which each content item was sent, and information identifying one or more items associated with each content item. Additionally, in the above example, the historical information associated with the customer 204 may describe interactions by the customer 204 with items at the physical retail store (e.g., picking up an item, placing an item in a storage area 156, purchasing an item, etc.) and a time associated with each interaction.

In some embodiments, historical information associated with a customer 204 included in a user profile of the customer 204 also may describe actions performed by the customer 204 within the online concierge system 102. For example, historical information associated with a customer 204 may describe orders placed by the customer 204 using the online concierge system 102 (e.g., descriptions of items included in each order, a time at which each order was placed, information identifying a physical retail store with which each order was placed, etc.). In this example, historical information associated with the customer 204 also may indicate whether the customer 204 viewed information associated with an item (e.g., product information, ingredient list, etc.). Additionally, in the above example, historical information associated with the customer 204 also may describe one or more content items sent for display to the customer 204 by the online concierge system 102 (e.g., information identifying each content item, a time at which each content item was sent, information indicating whether the customer 204 interacted with each content item, and information identifying one or more items associated with each content item).

In some embodiments, user profile information associated with a customer 204 may be stored in multiple databases. For example, in addition to the user database 414, historical information associated with a customer 204 also may be stored in the transaction records database 408 and/or the training datasets 420. In such embodiments, the information included in the user profile of a customer 204 may be identified based on information identifying the customer 204 (e.g., a username or other identifier of the customer 204) associated with the information. Furthermore, in some embodiments, user profile information associated with a customer 204 also may be stored in one or more databases in the shopping cart 150 (e.g., in the event database 324, in the context database 330 and/or the attribution database 338), as further described below.

In various embodiments, the order fulfillment engine 406 determines whether to delay display of a received order to pickers 208 for fulfillment by a time interval. In response to determining to delay display of the received order by a time interval, the order fulfilment engine 406 evaluates subsequent orders received during the time interval for inclusion in one or more batches that also include the received order. After the time interval, the order fulfillment engine 406 displays the order to one or more pickers 208 via the picker mobile application 212; if the order fulfillment engine 406 generated one or more batches including the received order and one or more subsequent orders received during the time interval, the batch(es) is/are also displayed to one or more pickers 208 via the picker mobile application 212.

User Quality Preference Determination Using Machine-Learning Models

The online concierge system 102 also includes a user quality preference determination engine 450 and one or more machine-learning models 416. The user quality preference determination engine 450 uses the machine-learning models 416 to determine quality sensitivity scores custom to individual users across various product categories. These scores quantitatively represent each user's sensitivity or responsiveness to the quality of products within specified categories. This personalized assessment enables tailored improvements to services provided to users, enhancing user satisfaction and engagement. In this context, "product" refers to any item offered to users; "product category" classifies these products into groups based on similar characteristics or uses, such as fruits, CPGs; and "sensitivity score" is a metric derived from user interactions and behaviors, indicating the degree of a user's concern or preference for quality within a category. This score helps in predicting user satisfaction and guiding service adjustments to better meet individual expectations and needs.

The one or more models 416 are configured to take specific input features and produce a quantifiable output. Input features include a range of data collected from user interactions with products, such as the time spent examining a product, the frequency of interactions with similar products, and the quality of products chosen. Additional data might also include user reactions to product quality during previous purchases and image data captured by smart devices, such as shopping carts equipped with cameras. The output of the models 416 is a quality sensitivity score for each user per product category, and/or an overall quality sensitivity score for each user. These scores represent the user's tendency to prioritize quality in their purchasing decisions.

The one or more machine-learning models 416 may be trained over data describing user interactions with different products and/or in different categories. In some embodiments, a machine learning model is trained over data describing user interactions with a particular product (e.g., apples). In some embodiments, multiple models are trained for different products. For example, a first model is trained to determine users' quality preference scores for apples, a second model is trained to determine users' quality preference scores for oranges, and so on and so forth. In some embodiments, a machine learning model is trained to determine users' quality preference scores for a category of product. For example, a first model is trained to determine users' quality preference scores for products, a second model is trained to determine users' quality preference scores for CPGs, and so on and so forth.

In some embodiments, sensors installed on shopping carts may be used to gather data on a user's interaction with products from a particular category or a particular product. This may include tracking which products the user examines, the duration of each interaction, and any changes in selection (e.g., swapping items). The sensors may also capture additional contextual data such as the time of day, the user's shopping speed, and other behavioral cues that might indicate a preference for quality. For example, the data may include what products were purchased for users (e.g., six Fuji apples) and which specific items for that product were purchased (e.g., six Fuji apples, two larger than average, one with a brown spot). Additionally, the shopping carts can also collect an amount of time and care a user uses when selecting produce, to help extrapolate how important the quality of this item is to that user.

The collected data is then analyzed to determine the user's sensitivity to quality. For instance, the system may determine (1) how long a user spent selecting a purchased item, (2) how many items a user picks up and examine before selecting the purchased item, (3) whether the purchased item is of higher quality than average quality of available items, (4) whether the user examines items of low quality and then fails to purchase any items of that type, (5) whether the user examines items of low quality and then purchases a different item of the same type, (6) whether the user inspects a product before purchasing the product, and/or (7) whether the user inspects a product having a quality defect and ultimately purchases the defected product.

This analyzed data can become signals indicating preferences for a particular product type (such as produce, apple, all produce). For instance, if a user frequently examines multiple items closely before making a selection, or prefers items from higher shelves typically associated with better quality, this could be an indicator of high sensitivity. A label is then assigned to the training example based on the observed actions. For example, if a user's action suggests a strong preference for quality, a corresponding training example is labeled as "sensitive". On the other hand, if a user's action does not show a concern for quality of over factors such as price or convenience, a corresponding training example is labeled as "not sensitive." In some embodiments, "sensitive" or "not sensitive" are corresponding to a binary flag 1 or 0. As such, a labeled dataset that reflects how user actions correlate with their quality sensitivity is generated and can be used to train a machine-learning model mode 416.

In some embodiments, the online concierge system 102 provides users with an in-store mode shopping list, which can be used to understand what a user plans to buy. The items on the shopping list can be compared to items actually bought in the store. The differences or similarities between the shopping list and purchased list can also be used as an input feature for the machine-learning model 416.

In some embodiments, the machine learning models 416 include multiple models in different levels. For example, a first level of models are trained to determine users' preference scores for particular products, a second level of models are trained to determine users' preference scores for particular categories of products, and a third level of model is trained to determine users' overall preference score for all categories of products. For each user, multiple quality preference scores for different levels are determined and stored with their corresponding user account in the user database 414.

Various machine-learning techniques can be implemented to train the machine-learning models. Such techniques include (but are not limited to) linear regression, logistic regression, decision trees and random forests, support vector machines (SVM), neural networks, K-nearest neighbors (KNN), ensemble methods (such as boosting, bagging), clustering algorithms, among others.

In some embodiments, the models 416 operate dynamically as user interactions occur. As data from sensors and user inputs are fed into the models 416, they evaluate and update the user's sensitivity score in real time or near real time. Such embodiments are advantageous in interactive environments where real time or near real time personalization of services (like recommendations or alerts) can be generated to enhance the user experience.

Alternatively, or in addition, batch processing may be performed for all users across all categories to generate sensitivity scores at regular intervals (e.g., daily, weekly). These scores are then stored in the users' profiles in the database. Such embodiments are efficient for systems where real-time scoring is not critical but where periodic updates are sufficient to maintain accurate and helpful user profiles.

In some embodiments, reinforcement learning is applied to the quality preference model based on users' feedback after the delivery of orders. For example, users may have issues with their online orders. In some embodiments, data associated with these issues may be used to perform reinforcement learning of the quality preference model. If a user reports quality issues with a produce item they ordered via the online concierge system, and the model has determined that this user has a low-quality preference score, negative reinforcement is applied to retrain the quality preference model because the model has incorrectly assessed how much the user cares about product quality. On the other hand, if a user does not report quality issues with their online orders, particularly when the quality preference model has determined that this user has a low-quality preference score, positive reinforcement is applied to retrain the quality preference model because this data indicates that the model correctly assessed how much the user cares about product quality.

In some embodiments, cold start data is generated based on aggregate preferences for a retailer. For example, users shopping at a first retailer may be pickier about their produce than users shopping at another retailer. Thus, when a new user places an order from a particular retailer, there may not be enough data for the system to determine that new user's preference score. In such cases, the user's default preference score may be set to the overall or average preference score of all users who shopped at the same retailer.

Use Cases

In some embodiments, the user quality preference determination engine 450 is configured to receive and analyze image data captured by cameras of smart shopping carts 150. The captured image includes images about a physical interaction of a user with a product. The product is within a target category of products. The user quality preference determination engine 450 analyzes the collected data to determine a set of input features. The set of input features may include (but are not limited to) one or more of: a quality score for the product, a length of time that the user interacted with the product, a number of other products interacted with by the user before the product was added to the shopping cart, whether the user added the product to the shopping cart after interacting with the product and/or whether the user added another product to the shopping cart after interacting with the product. The user quality preference determination engine 450 applies the machine learning model(s) 416 to the set of input features to determine a quality preference score of the user. The quality preference score indicates a likelihood that the user would be dissatisfied with the product of low quality, and stores the quality preference score of the user in connection with an account of the user in the user database 414.

The online concierge system 102 may later receive an online order from a client device of the user. The online order includes a product within the target category of products. The online concierge system 102 retrieves the quality preference score of the user from the user database 414, and determines whether the quality preference score of the user is greater than a threshold. Responsive to determining that the quality preference score of the user is greater than the threshold, the online concierge system 102 transmits a notification about the quality preference score of the user to a client device of a picker who is fulfilling the online order.

The user may later provide feedback from their client device about the product in the order. The user feedback may indicate whether the user was satisfied or dissatisfied with quality of the product in the order. The user feedback may then be used to retrain the machine learning model 416. In some embodiments, reinforcement training is performed based on the user feedback.

In some embodiments, the images collected by the shopping carts 150 further include images associated with products available in a retail store and images associated with product items placed in a shopping cart. The user quality preference determination engine 450 applies a first machine-learning model to image data associated with products available in a retail store to determine a first quality score indicating an overall quality of products available. The user quality preference determination engine 450 also applies a second machine-learning model (which may or may not be the same as the first machine-learning model) to image data associated with product items placed in a shopping cart to determine a second quality score indicating a quality of products selected by a user and placed in the shopping cart.

As described above with respect to FIG. 3, the shopping carts 150 are also configured to capture other data associated with shopping sessions of users such as location data associated with a section or aisle of a retail store where the user stops, and how much time a user spends in the section or aisle of the retail store.

In some embodiments, user quality preference determination engine 450 feeds the first quality score, the second quality score, and/or how much time the user spends in a particular section or aisle of a retail store, among other data into a third machine learning model. The third machine learning model aggregates the data for the user over a series of visits to the same or different retail stores. analyzes the decision the user makes under various circumstances, and determines a quality preference score indicating how much this user prioritizes the quality of a product, a category of a product, and/or all products in their in-store shopping experience.

In some embodiments, a separate score is generated at a different level of granularity. For example, an overall score for all product categories is generated to indicate an overall sensitivity or preference of the user over quality of all product categories; a score for a specific product category (e.g., produce) is generated to indicate sensitivity or preference of the user over quality of the specific product category; and a score for a specific product (e.g., apples) is generated to indicate sensitivity or preference of the user over the quality of the specific product.

For example, the shopping cart 150 may include cameras configured to capture images of items placed in the shopping cart and the items available in the retail store. When a user places apples in the shopping cart, an image of the apples is captured. The user quality preference determination engine 450 is configured to analyze the image data to determine how many apples the user placed in the shopping cart and their qualities, e.g., 6 Fuji apples, 2 larger than average, 1 with a brown spot. The shopping cart 150 can also collect an amount of time and care a user uses when selecting apples. For example, the user quality preference determination engine 450 may determine that because the user has spent more than 5 minutes selecting apples, and they picked up and examined 20 apples before purchasing only 6, that the apples they selected are higher quality on average than the available produce that day. The user quality preference determination engine 450 may also determine whether there are only smaller or bruised apples available in the retail store when the user is there. If that is the case, the user quality preference determination engine 450 may further determine whether the user has bought a number of apples they had planned to purchase anyway, or whether they adjusted the quantity downward, or bought other produce instead. The user quality preference determination engine 450 can then feed all these features into a third machine-learning model to determine a quality preference score for the user, which indicates the user's sensitivity to the quality of apples.

Figure 5:
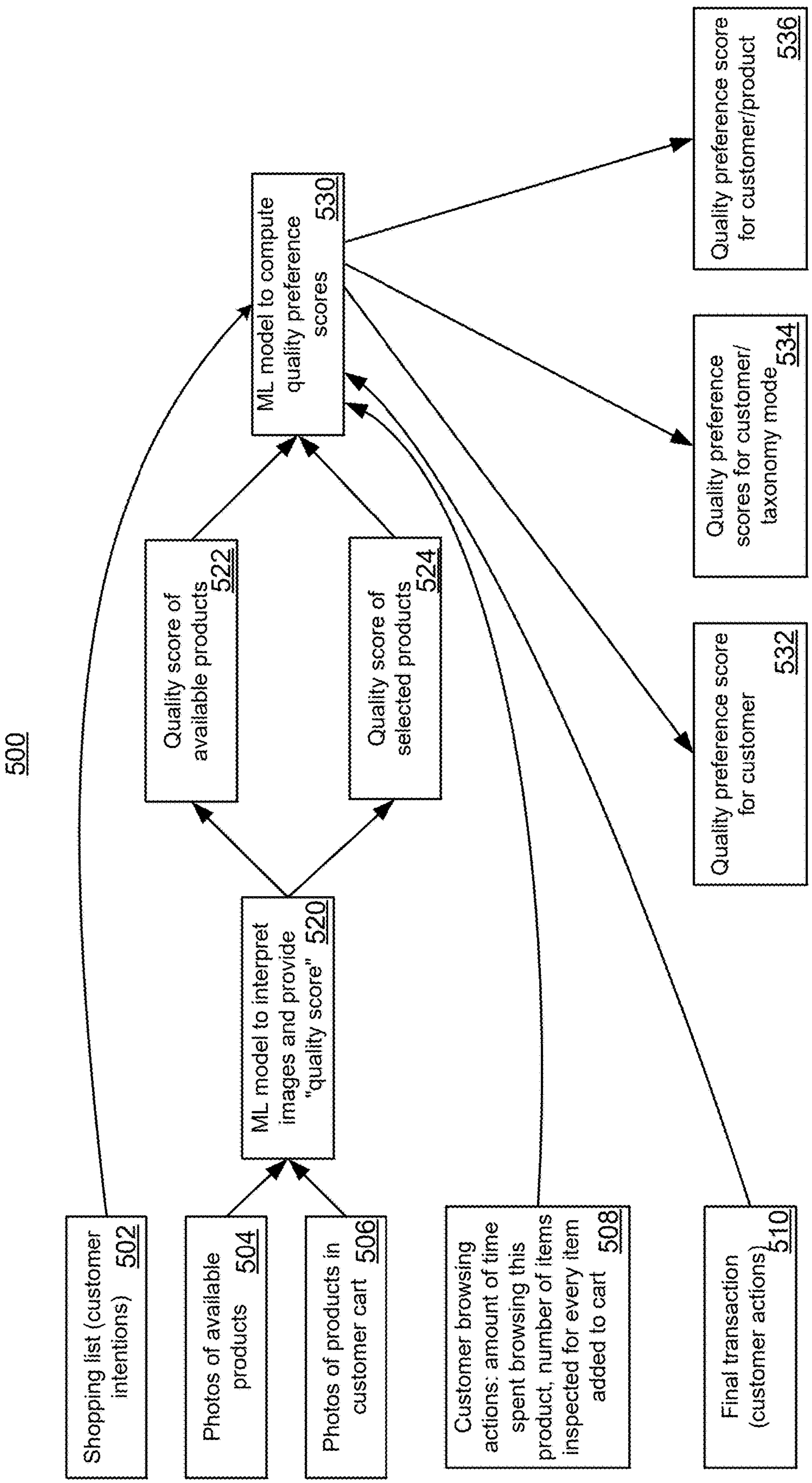
FIG. 5 illustrates a machine-learning process for evaluating user interactions with products and determining quality preference scores, in accordance with one or more embodiments.

FIG. 5 illustrates a machine-learning process 500 for evaluating user interactions with products and determining quality preference scores, in accordance with one or more embodiments. The online concierge system 102 receives a shopping list 502 from a client device of a user. This shopping list 502 may be generated by the user and represent the user's intended purchases. The online concierge system 102 also obtains images describing available products 504 that are available for purchase. These images may be captured by cameras on different users' shopping carts. The online concierge system 102 also receives images or products placed in a user's shopping cart 506. These images may also be captured by cameras on different users' shopping carts. The online concierge system also obtains customer browsing actions 508. Such data includes data on how the user interacts with products, such as a time spent inspecting a product and a number of products inspected before adding a product to the cart. The online concierge system 102 also obtains a final transaction 510, indicating records of the user's final purchasing decisions. This final transaction 501 may be obtained from a point-of-sale (POS) device that the user used to check out all the items in their shopping cart.

The obtained images and data are processed by machine-learning models. The machine-learning models may include one or more models configured to receive images of a product and determine a quality score 520 of the product. The images may include images of both available products and the selected products. In some embodiments, a first quality score 522 is determined for the available products, and a second quality score 524 is determined for the products that the user has added to their shopping cart.

In some embodiments, the machine-learning models include one or more models configured to receive additional input data describing a user's interaction with a product and the quality scores of the available products to determine various preference scores related to the customer and the products. In some embodiments, a first score that reflects an overall quality preference of the user is determined based on the user's interactions and transactions with different types of products. In some embodiments, a second score that reflects the user's preference for a specific category of products is determined based on the user's interactions and transactions with the specific category of products, such as produce, CPG, etc. In some embodiments, a third score that reflects the user's preference for a specific product is determined based on the user's interactions and transactions with the specific product, e.g., apples, oranges, etc. These different quality preference scores 532, 534, 536 are stored with the user's account in a user database 414. The stored quality preferences scores 532, 534, 536 can later be retrieved when the user places an online order to guide a picker during the fulfillment of the online order.

Figure 6:
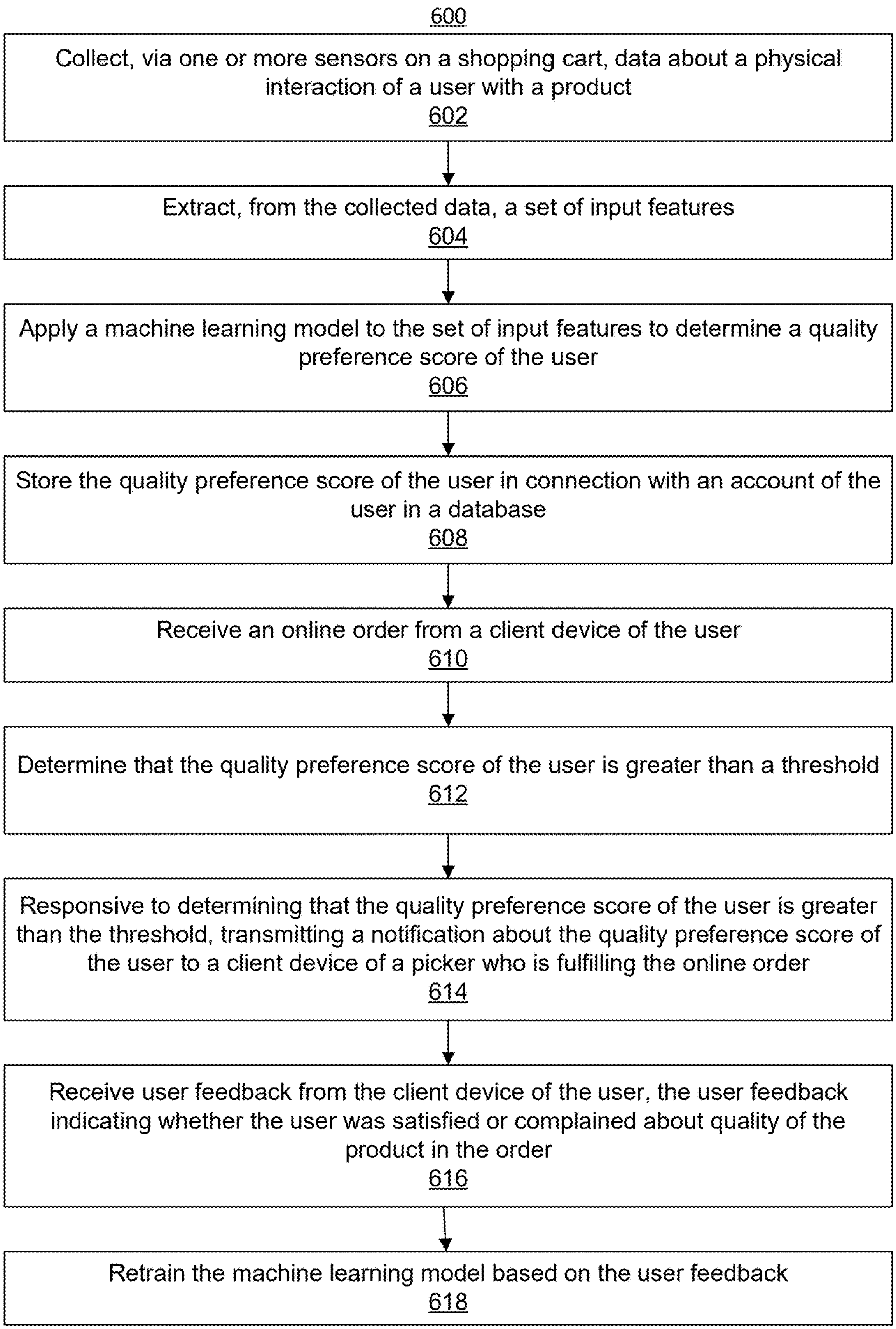
FIG. 6 is a flowchart of a method for using machine learning to determine quality preferences of users, in accordance with one or more embodiments.

Example Method for Using Machine Learning to Determine Quality Preference of Users FIG. 6 is a flowchart for a method 600 for using machine learning to determine quality preference of users, in accordance with some embodiments. Alternative embodiments may include more, fewer, or different steps from those illustrated in FIG. 6, and the steps may be performed in a different order from that illustrated in FIG. 6. These steps may be performed by an online concierge system (e.g., online concierge system 102). Additionally, each of these steps may be performed automatically by the online concierge system without human intervention.

The online concierge system 102 collects 602, via one or more sensors on a shopping cart (e.g., shopping cart 150), data about a physical interaction of a user with a product. In some embodiments, the one or more sensors include cameras configured to capture images of available products in a retail store, user interactions with the product, and a product placed into the shopping cart by the user. In some embodiments, the product is within a target category of products. In some embodiments, different products are grouped into a plurality of categories, such as produce, meat, seafood, frozen food, bakery, CPG, among others.

The online concierge system 102 extracts 604, from the collected data, a set of input features. The input features may include (but are not limited to) one or more of: a quality score for the product, a length of time that the user interacted with the product, a number of other products interacted with by the user before the product was added to the shopping cart, whether the user added the product to the shopping cart after interacting with the product or whether the user added another product to the shopping cart after interacting with the product. In some embodiments, the quality score for the product is determined based on analyzing the captured images of available products in the retail store.

The online concierge system 102 applies 606 a machine learning model to the set of input features to determine a quality preference score of the user. The preference score indicates a likelihood that the user would be dissatisfied with the product of low quality. In some embodiments, for each category, a separate quality preference score is determined for the user indicating a likelihood that the user would be dissatisfied with the corresponding category of products. In some embodiments, for each product, a separate quality preference score is determined for the user, indicating a likelihood that the user would be dissatisfied with the corresponding product. In some embodiments, an overall quality preference score is determined for the user, indicating an overall likelihood that the user would be dissatisfied with any product.

The online concierge system 102 stores 608 the quality preference score of the user in connection with an account of the user in a database. In some embodiments, multiple quality preference scores, each corresponding to a category of products, are stored in the database. In some embodiments, multiple quality preference scores, each corresponding to a product, are stored in the database. In some embodiments, the overall quality preference score is stored in the database. In some embodiments, a plurality of quality preference scores for different levels of products (e.g., corresponding to specific products, corresponding to specific categories of products, corresponding to all products) are all stored in the database.

The online concierge system 102 receives 610 an online order from a client device of the user. For example, the user uses their account to log into the online concierge system 102, and generates an online order. Responsive to receiving the online order, the online concierge system 102 sends the order to one or more available pickers, one of who may accept the order and fulfill the order.

The online concierge system 102 determines 612 that the quality preference score of the user is greater than a threshold. After the quality preference model is trained and applied to users, each user is assigned one or more quality preference scores. These scores can help pickers make decisions when there are not enough high-quality items available.

In some embodiments, the online concierge system 102 accesses the user account to retrieve one or more quality preference scores of the user. In some embodiments, the retrieved quality preference score may correspond to the particular product in the order. In some embodiments, the retrieved quality preference score may correspond to the particular category of products in the order. For example, when a particular product in the order may not have a corresponding product quality score stored in the database, the online concierge system 102 determines a category that the product belongs to, and retrieves a product quality score of the category. In some embodiments, the retrieved quality preference score may correspond to an overall quality preference of the user depending on the products ordered by the user.

In some embodiments, the quality preference scores for users are corresponding to a taxonomy of product categories. If a product in the order lacks a stored quality preference score, the online concierge system 102 can identify a most similar product with an available quality preference score based on the taxonomy and use that score as a substitute for the product in the order.

The online concierge system 102 transmits 614 a notification about the quality preference score of the user to a client device of a picker who is fulfilling the online order. In some embodiments, the notification may be a general alert indicating that the user cares about quality of all products. In some embodiments, the notification may be a more specific alert indicating that the user cares about quality of a particular product in the order, or a particular category of product in the order.

In some embodiments, the online concierge system 102 generates the notification based on the quality score of a product and the user's quality preference score of that product. For example, when an overall quality score of apple in a retail location is fairly low, and the user's quality preference score of apple is fairly high, the online concierge system 102 may generate a notification to the picker, suggesting that a refund for the apples be issued to the user.

For example, when a picker is fulfilling an online order, they may face a situation where only low-quality items are available, such as bruised produce or dented CPG boxes. They need to determine how to fulfill that item. They have several options: (1) pick the damaged items, (2) pick only high-quality items, even if it means getting fewer items (e.g., apples) than the user ordered, (3) replace the item with a similar one that has higher-quality alternatives available (e.g., a different size or varietal of the same produce item), (4) refund the item, and/or (5) reach out to the user to ask for input. When such a situation occurs, the online concierge system can provide guidance on how to proceed based on the user's quality preference scores.

Responsive to receiving the notification, the picker may take a picture of available products, e.g., apples on the shelf, and send the picture to the online concierge system 102. The online concierge system 102 may then analyze the received image using a machine learning model to determine a quality score, and provide specific recommendation based on the quality score of the product and the user's quality preference score. The recommendations may include (but are not limited to) (1) picking low-quality products, (2) picking only high-quality products, even if it means getting fewer products than the user ordered, (3) replacing the product with an available higher-quality alternative product, (4) refunding the product, and/or (5) reaching out to the user to ask for input.

In some embodiments, the notification may prompt the picker to inspect the quality of a particular produce, e.g., apples. Responsive to the notification, the picker can either tap a button in the app to say "only low-quality items available," or optionally take a photo of the items. When a picture of the items (e.g., apples on the shelf) is taken, the picture data may be fed to the first or second machine learning model trained to compute quality scores for products when users or pickers are shopping in store. Given the quality score of the item, and how much the quality preference scores of the user, the online concierge system can direct the picker to take one of the actions. For example, the online concierge system 102 may provide specific recommendations based on the quality score of the product and the user's quality preference score. The recommendations may include (but are not limited to) (1) picking low-quality products, (2) picking only high-quality products, even if it means getting fewer products than the user ordered, (3) replacing the product with an available higher-quality alternative product, (4) refunding the product, and/or (5) reaching out to the user to ask for input.

Alternatively, in cases of lower confidence, the online concierge system may suggest that the picker reach out to the customer directly first, and take a recommended action only if they don't hear back.

In some cases, after the user receives their order, they may provide feedback to the online concierge system 102. The online concierge system 102 receives 616 the user feedback from the client device of the user. The feedback indicates whether the user was satisfied or dissatisfied with quality of the product in the order.

The online concierge system 102 retrains 618 the machine learning model based on the user feedback. In some embodiments, the retraining of the machine learning model is based on reinforcement learning. During reinforcement learning, an agent module learns to make decisions by performing actions in an environment and receiving feedback in the form of rewards or penalties based on the outcomes of those actions, which can optimize the decision-making process and adaptively improve performance overtime. Actions could include various responses the system might take, such as adjusting product recommendations, altering notification strategies, or modifying how products are picked for the user based on their preferences. For example, if the user's feedback is positive (e.g., expressing satisfaction with the product quality), the system receives a reward. Conversely, if the feedback is negative (e.g., dissatisfied with product quality), the system incurs a penalty. These rewards and penalties guide the learning process.

In some embodiments, the online concierge system 102 aggregates user quality preferences scores for all users who have shopped in a particular retail store to determine an overall quality preference score. In some embodiments, when a new user is signed up for the particular retail store, cold start data is generated based on aggregate preferences for the retail store. For example, users shopping at a first retail store may be pickier about their produce than users shopping at another retail store. Thus, when a new user places an order from a particular retail store, there may not be enough data for the system to determine that new user's preference score. In such cases, the user's default preference score may be set to the overall or average preference score of all users who shopped at the same retailer.

In some embodiments, the data captured by the smart shopping cart may be used to determine when a particular product is restocked, indicating that high-quality products are available. For users who care a great deal about quality, and have purchased products in the past, the online concierge system 102 may send them a push notification, e.g., "Your local xxx store just got a fresh batch of Fuji apples! See the assortment here." The online concierge system 102 may also invite such users to open up a new online order.

Further, the data about users of a particular store can also help retail stores to obtain insights about their users. In some embodiments, the online concierge system 102 may provide recommendations to the retail store, e.g., whether it is worth buying strawberries from a producer that generally produces low-quality strawberries that are nearly white if their clientele cares highly about strawberry quality, or whether the retailer should test out a higher-quality producer that could see an increased return on investment rather than having to throw out a large amount of leftover strawberries that were never sold.

In some embodiments, the online concierge system 102 may aggregate quality preference scores of users for various dimensions, such as a particular retail store, a particular geo-region, a particular retailer across different regions, a particular category of product, a particular product, among others. The online concierge system 102 can generate a report to visualize the aggregated quality preference scores for various purposes. For example, the online concierge system 102 can generate reports for each retail store to show the overall quality preferences of its clientele, for retail stores in a specific region to illustrate regional quality preferences, or for producers of a specific product to show their clientele's overall quality preferences.

In some embodiments, when user is shopping at a retail store, responsive to determining that the quality score of the product with which the user interacts is below a threshold, the online concierge system 102 identifies an alternative product that has a quality score greater than the threshold, and recommends an alternative product of higher quality to the user.

In some embodiments, responsive to determining that the length of time that the user is interacting with the product is greater than a threshold time, the online concierge system 102 identifies an alternative product that has a quality score greater than the quality score of the product that the user is interacting with, and recommends the alternative product to the user.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method performed at a computer system comprising a processor and a computer-readable medium, comprising:

collecting, via one or more sensors on a shopping cart, data about a physical interaction of a user with a product, wherein the product is within a target category;

extracting, from the collected data, a set of input features, wherein the set of input features includes one or more of: a quality score for the product, a length of time that the user interacted with the product, a number of other products interacted with by the user before the product was added to the shopping cart, whether the user added the product to the shopping cart after interacting with the product, or whether the user added another product to the shopping cart after interacting with the product;

applying a machine learning model to the set of input features to generate a quality preference score of the user for the target category of products, wherein the machine learning model is trained by:

accessing a training dataset including input features associated with user interactions with products, the input features are labeled with respective user quality preference scores; and iteratively adjusting parameters of the machine learning model by backpropagating errors between predicted user quality preference scores with labeled user quality preference scores;

storing the quality preference score of the user in connection with an account of the user in a database;

receiving an online order from a client device of the user, the online order including a second product within the target category;

identifying whether the quality preference score of the user is greater than a threshold; and responsive to identifying that the quality preference score of the user is equal to or greater than the threshold, transmitting a notification about the quality preference score of the user to a client device of a picker who is fulfilling the online order, causing the client device of the picker to dynamically display a picking list.

2. The method of claim 1, further comprising:

receiving user feedback from the client device of the user, the user feedback indicating whether the user was satisfied or dissatisfied with quality of the product in the order; and retraining the machine learning model based on the user feedback.

3. The method of claim 1, wherein generating the quality preference score comprises generating a likelihood that the user would be dissatisfied with a product of low quality within the target category.

4. The method of claim 1, further comprising:

identifying that a retail store had only products having a quality score less than the threshold within the target category; and responsive to identifying that a product having a quality score greater than the threshold within the target category is restocked, generating and transmitting a notification to the client device of the user.

5. The method of claim 1, further comprising:

responsive to determining that the quality score of the product with which the user interacts is below the threshold:

identifying an alternative product that has a quality score greater than the threshold; and recommending alternative product to the user.

6. The method of claim 1, further comprising:

responsive to determining that the length of time that the user is interacting with the product is greater than a threshold time:

identifying an alternative product that has a quality score greater than the quality score of the product that the user is interacting with; and recommending the alternative product to the user.

7. The method of claim 1, further comprising:

generating a quality preference score for each of a plurality of users who shopped at a particular retail store;

aggregate quality preference scores of the plurality of users; and generating a report of quality preference visualizing overall quality preferences of the plurality of users of the particular retail store.

8. The method of claim 1, wherein the one or more sensors comprise one or more cameras configured to capture images of the product with which the user interacts, or the product added to the shopping cart.

9. The method of claim 8, further comprising:

applying a second machine learning model to the captured images of the product to the quality score of the product, the second machine learning model is trained over images of products of the target category labeled with quality scores.

10. The method of claim 1, wherein extracting, from the collected data, a set of input features comprises:

receiving a first shopping list from the user, indicating a first list of products that the user intends to purchase;

generating a second shopping list for the user, indicating a second list of products that the user purchased; and comparing the first list of products on the first shopping list with a second list of products on the second shopping list to determine whether a product from the target category listed in the first shopping list was purchased as indicated in the second shopping list.

11. The method of claim 1, further comprising:

receiving an inquiry from the client device of the picker, the inquiry indicates that there is an insufficient amount of products having a quality score greater than the threshold available;

identifying an option from a plurality of options based on the quality preference score of the user, the plurality of the options comprising (1) picking products having a quality score less than the threshold, (2) picking only products having a quality score greater than the threshold, (3) replacing the second product with an available alternative product having a quality score greater than a quality score of the second product, (4) refunding the second product, or (5) reaching out to the user to ask for input; and transmitting the identified option to the client device of the picker as a recommended option.

12. The method of claim 11, wherein the inquiry from the client device of the picker comprises an image of the second product captured by a camera of the client device of the picker, and wherein the method further comprises:

applying another machine learning model to the image of the second product received from the client device of the picker to determine a quality score of the second product available in a retail store, and identifying the option from the plurality of options further based on the quality score of the second product available in the retail store.

13. A non-transitory computer readable storage medium having instructions encoded thereon that, when executed by one or more processors, cause the one or more processors to perform steps of:

collecting, via one or more sensors on a shopping cart, data about a physical interaction of a user with a product, wherein the product is within a target category;

extracting, from the collected data, a set of input features, wherein the set of input features includes one or more of: a quality score for the product, a length of time that the user interacted with the product, a number of other products interacted with by the user before the product was added to the shopping cart, whether the user added the product to the shopping cart after interacting with the product, or whether the user added another product to the shopping cart after interacting with the product;

applying a machine learning model to the set of input features to generate a quality preference score of the user for the target category of products, wherein the machine learning model is trained by:

accessing a training dataset including input features associated with user interactions with products, the input features are labeled with respective user quality preference scores; and iteratively adjusting parameters of the machine learning model by backpropagating errors between predicted user quality preference scores with labeled user quality preference scores;

storing the quality preference score of the user in connection with an account of the user in a database;

receiving an online order from a client device of the user, the online order including a second product within the target category;

identifying whether the quality preference score of the user is greater than a threshold; and responsive to identifying that the quality preference score of the user is equal to or greater than the threshold, transmitting a notification about the quality preference score of the user to a client device of a picker who is fulfilling the online order, causing the client device of the picker to dynamically display a picking list.

14. The non-transitory computer readable storage medium of claim 13, wherein the steps further comprise:

receiving user feedback from the client device of the user, the user feedback indicating whether the user was satisfied or dissatisfied with quality of the product in the order; and retraining the machine learning model based on the user feedback.

15. The non-transitory computer readable storage medium of claim 13, wherein generating the quality preference score comprises generating a likelihood that the user would be dissatisfied with a product of low quality within the target category.

16. The non-transitory computer readable storage medium of claim 13, wherein the steps further comprise:

identifying that a retail store had only products having a quality score less than the threshold within the target category; and responsive to identifying that a product having a quality score greater than the threshold within the target category is restocked, generating and transmitting a notification to the client device of the user.

17. The non-transitory computer readable storage medium of claim 13, wherein the steps further comprise:

responsive to determining that the quality score of the product with which the user interacts is below the threshold:

identifying an alternative product that has a quality score greater than the threshold; and recommending alternative product to the user.

18. The non-transitory computer readable storage medium of claim 13, wherein the steps further comprise:

responsive to determining that the length of time that the user is interacting with the product is greater than a threshold time:

identifying an alternative product that has a quality score greater than the quality score of the product that the user is interacting with; and recommending the alternative product to the user.

19. The non-transitory computer readable storage medium of claim 13, wherein extracting, from the collected data, a set of input features comprises:

receiving a first shopping list from the user, indicating a first list of products that the user intends to purchase;

generating a second shopping list for the user, indicating a second list of products that the user purchased; and comparing the first list of products on the first shopping list with a second list of products on the second shopping list to determine whether a product from the target category listed in the first shopping list was purchased as indicated in the second shopping list.

20. A computing system, comprising:

one or more processors: and a non-transitory computer readable storage medium having instructions encoded thereon that, when executed by the one or more processors, cause the one or more processors to perform steps of:

collecting, via one or more sensors on a shopping cart, data about a physical interaction of a user with a product, wherein the product is within a target category;

extracting, from the collected data, a set of input features, wherein the set of input features includes one or more of: a quality score for the product, a length of time that the user interacted with the product, a number of other products interacted with by the user before the product was added to the shopping cart, whether the user added the product to the shopping cart after interacting with the product, or whether the user added another product to the shopping cart after interacting with the product;

applying a machine learning model to the set of input features to generate a quality preference score of the user for the target category of products, wherein the machine learning model is trained by:

accessing a training dataset including input features associated with user interactions with products, the input features are labeled with respective user quality preference scores; and iteratively adjusting parameters of the machine learning model by backpropagating errors between predicted user quality preference scores with labeled user quality preference scores;

storing the quality preference score of the user in connection with an account of the user in a database;

receiving an online order from a client device of the user, the online order including a second product within the target category;

identifying whether the quality preference score of the user is greater than a threshold; and responsive to identifying that the quality preference score of the user is equal to or greater than the threshold, transmitting a notification about the quality preference score of the user to a client device of a picker who is fulfilling the online order, causing the client device of the picker to dynamically display a picking list.

* * * * *